(12) United States Patent
Ariyama

(10) Patent No.: US 7,836,375 B2
(45) Date of Patent: Nov. 16, 2010

(54) SCRAMBLER CIRCUIT, ENCODING DEVICE, ENCODING METHOD AND RECORDING APPARATUS

(75) Inventor: Takeo Ariyama, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 1223 days.

(21) Appl. No.: 11/366,629

(22) Filed: Mar. 3, 2006

(65) Prior Publication Data

US 2006/0206780 A1    Sep. 14, 2006

(30) Foreign Application Priority Data

Mar. 4, 2005    (JP)    ............................. 2005-060364

(51) Int. Cl.
*H03M 13/00*    (2006.01)
(52) U.S. Cl. ..................................... 714/755
(58) Field of Classification Search ................. 714/718, 714/755

See application file for complete search history.

(56) References Cited

U.S. PATENT DOCUMENTS

| | | | | | |
|---|---|---|---|---|---|
| 4,993,029 | A | * | 2/1991 | Galbraith et al. | ............. 714/769 |
| 5,920,529 | A | * | 7/1999 | Ota et al. | ....................... 369/84 |
| 6,128,700 | A | * | 10/2000 | Hsu et al. | .................... 711/122 |
| 6,332,206 | B1 | * | 12/2001 | Nakatsuji et al. | ............. 714/755 |
| 6,526,010 | B1 | * | 2/2003 | Morioka et al. | .......... 369/47.15 |
| 6,874,044 | B1 | * | 3/2005 | Chou et al. | .................... 710/62 |
| 7,434,140 | B2 | * | 10/2008 | Lin et al. | ..................... 714/758 |
| 2003/0179670 | A1 | * | 9/2003 | Fukushima et al. | ....... 369/47.53 |
| 2005/0066110 | A1 | * | 3/2005 | Raz et al. | ..................... 711/103 |

FOREIGN PATENT DOCUMENTS

| | | |
|---|---|---|
| JP | 2000-228055 | 8/2000 |
| JP | 2001-177419 | 6/2001 |
| JP | 2003-123392 | 4/2003 |
| JP | 2004-192749 | 7/2004 |
| JP | 2005-025912 | 1/2005 |
| WO | WO 2004021619 A2 * | 3/2004 |

OTHER PUBLICATIONS

Japanese Office Action dated Apr. 9, 2009 with a partial English-language translation.
Japanese Office Action dated Dec. 1, 2009 (with partial English translation).
"Next Generation Optical Disk", Nikkei Electronic Books, issued Oct. 7, 2003.

* cited by examiner

*Primary Examiner*—Scott T Baderman
*Assistant Examiner*—Enam Ahmed
(74) *Attorney, Agent, or Firm*—McGinn IP Law Group, PLLC

(57) ABSTRACT

An encoding device includes a buffer for performing EDC generation, scrambling and ECC generation on user data arranged along user data direction Q that is read out from a data buffer of SDRAM and storing the operation results, a substitution buffer for repeatedly reading out the user data by burst transfer from the data buffer and outputting the data in recording frame direction P, and a scrambler for scrambling the data output from the substitution buffer along the direction P according to the operation results and outputting scrambled data. The substitution buffer is configured by SRAM and has a memory capacity of equal to or larger than a minimum capacity to output user data in the direction P and smaller than a memory capacity of the data buffer.

28 Claims, 25 Drawing Sheets

| | C=0 | C=1 | C=2 | C=3 | C=4 | C=5 | C=6 | C=7 | C=8 | C=9 | C=10 | C=11 | C=12 | C=13 | C=14 | C=15 | C=16 | C=17 | C=18 |
|---|---|---|---|---|---|---|---|---|---|---|---|---|---|---|---|---|---|---|---|
| R=0 | 0 | 216 | 432 | 648 | 864 | 1080 | 1296 | 1512 | 1728 | 1944 | 108 | 324 | 540 | 756 | 972 | 1188 | 1404 | 1620 | 1836 |
| R=1 | 1 | 217 | 433 | 649 | 865 | 1081 | 1297 | 1513 | 1729 | 1945 | 109 | 325 | 541 | 757 | 973 | 1189 | 1405 | 1621 | 1837 |
| R=2 | 2 | 218 | 434 | 650 | 866 | 1082 | 1298 | 1514 | 1730 | 1946 | 110 | 326 | 542 | 758 | 974 | 1190 | 1406 | 1622 | 1838 |
| R=3 | 3 | 219 | 435 | 651 | 867 | 1083 | 1299 | 1515 | 1731 | 1947 | 111 | 327 | 543 | 759 | 975 | 1191 | 1407 | 1623 | 1839 |
| R=4 | 4 | 220 | 436 | 652 | 868 | 1084 | 1300 | 1516 | 1732 | 1948 | 112 | 328 | 544 | 760 | 976 | 1192 | 1408 | 1624 | 1840 |
| R=5 | 5 | 221 | 437 | 653 | 869 | 1085 | 1301 | 1517 | 1733 | 1949 | 113 | 329 | 545 | 761 | 977 | 1193 | 1409 | 1625 | 1841 |
| R=6 | 6 | 222 | 438 | 654 | 870 | 1086 | 1302 | 1518 | 1734 | 1950 | 114 | 330 | 546 | 762 | 978 | 1194 | 1410 | 1626 | 1842 |
| R=7 | 7 | 223 | 439 | 655 | 871 | 1087 | 1303 | 1519 | 1735 | 1951 | 115 | 331 | 547 | 763 | 979 | 1195 | 1411 | 1627 | 1843 |
| R=214 | 214 | 430 | 646 | 862 | 1078 | 1094 | 1510 | 1726 | 1942 | 106 | 322 | 538 | 754 | 970 | 1186 | 1402 | 1618 | 1834 | 2050 |
| R=215 | 215 | 431 | 647 | 863 | 1079 | 1095 | 1511 | 1727 | 1943 | 107 | 323 | 539 | 755 | 971 | 1187 | 1403 | 1619 | 1835 | 2051 |

Fig. 3

SCRAMBLER CIRCUIT, ENCODING DEVICE, ENCODING METHOD AND RECORDING APPARATUS

BACKGROUND OF THE INVENTION

1. Field of the Invention

The present invention relates to a recording apparatus for improving a recording speed of recording data onto an optical disc, an encoding device and an encoding method applied to the recording apparatus, and a scrambler circuit suitably applicable to the encoding device.

2. Description of Related Art

Following so-called 1st generation optical discs such as CD, CD-R/RW and CD-ROM and 2nd generation optical discs such as Digital Versatile Disc (DVD), so-called 3rd generation optical disc that is Blu-ray discs with a shorter light source wavelength of 405 nm (blue-violet light) has been developed. The Blu-ray discs allows reading and writing record marks at a recording density of about five times that of DVD by increasing the numerical aperture (NA) of an objective lens to 0.85 to reduce a beam spot area to about one-fifth that of DVD in addition to shortening a light source wavelength. Further, Blu-ray discs have a phase change recording layer that is covered with a transparent covering layer of 0.1 mm thick and placed on a disc substrate, thereby reducing aberration due to the relative inclination of a disc and laser light (cf. "Next generation optical disc" Nikkei Electronics Books, Oct. 7, 2003).

The data structure of a Blu-ray disc is specified as follows by the standard. FIG. 20 is a view to describe the data structure of a Blu-ray disc. In the Blu-ray standard, recording data is recorded onto a disc 301 in units of recording unit block (RUB) 302, which is referred to herein also as the cluster. The RUB 302 is made up of run-in 303 and run-out 305 that are a buffer field or a gap field for data overwrite, and a physical cluster 304 that is placed between these fields. The run-in 303 is composed of 2760 channel bits (cbs) and the run-out 305 is composed of 1104 cbs. The physical cluster is composed of 1932 cbs*496 frames=958272 cbs. The run-in 303 and the run-out 305 add up to a channel bit length of two frames or recording frames, which are described later. The physical cluster 304 is composed of burst indicator subcode (BIS) that contains user data, disc address information and so on.

The physical cluster 304 is composed of 496 recording frames 306. A frame sync is placed in the beginning of each recording frame 306. Thus, 498 frames which are a sum of the 496 frames (recording frames 306) that constitute the physical cluster 304 and the 2 frames of the run-in 303 and the run-out 305 form 1 RUB 302.

The recording frame 306 is composed of 1932 cbs and modulated by 1-7 PP (parity preserve/prohibit RMTR) code. It is then demodulated and Digital sum value (DSV) control (decontrol) bit is deleted from the demodulated data, thereby creating an ECC cluster.

FIG. 21 is a diagram showing an ECC cluster. An ECC cluster 401 is made up of 496 frames, which includes user data 402, ECC parity 404 and BIS 403. The extraction of the user data 402 and the EC parity 404 forms a long distance code (LDC) cluster, and 64 frames of the 496 frames form the ECC parity 404. The extraction of the BIS 403 forms a BIS cluster.

The BIS cluster contains address information of a disc. The address information (9 bytes) of the BIS cluster is allocated to each address unit having 31 frames, which is formed by dividing the ECC cluster of 496 frames into 16 segments. The BIS is composed of 9 bytes with 3 frames, which is 3 bytes per frame, address is contained in the first 4 bytes. Thus, obtaining the first 2 frames in each address unit allows obtaining address information (address unit number) of each address unit. The BIS cluster changes into the format called the BIS block when it is deinterleaved. The LDC cluster also changes into the format called the LDC block when it is deinterleaved.

FIG. 22 is a diagram showing an LDC block 501. The LDC block is created by deinterleaving the data which is obtained by extracting the user data 402 and the ECC parity 404 from the ECC cluster shown in FIG. 21 and which has 152 bytes in the horizontal direction (one frame) and 496 frames in the vertical direction. The deinterleaving process is performed in two stages. Firstly, the process increases a shift amount by 3 bytes every 2 frames and makes rotation in the right direction on the drawing. The process then inserts each byte of an even number frame between each byte of an odd number frame, thereby creating the data having 304 bytes, which is double the data before the deinterleaving, in the horizontal direction (one frame) and 248 frames, which is half, in the vertical direction.

In FIG. 22, the part of the LDC block 501 other than the ECC parity 503 is data block 502. One data block is composed of 32 sectors from Sec 0 to Sec 31. One sector has 2052 bytes, which includes 2048 bytes of the user data 504 and 4 bytes of error detecting code (EDC) 505. If the direction of data recording sequence is a recording frame direction P and the direction as user data is a user data direction Q, the recording frame direction P is in the horizontal direction (row direction) on the drawing and the user data direction Q is in the vertical direction (column direction) on the drawing. Thus, the data recording sequence and the user data sequence are different.

One sector has user data sequences, each sequence having 216 bytes, that are arranged in the user data direction Q in folded configuration. Thus, in the user data 504, each sequence (216 bytes) is arranged in the recording frame direction P. One sector Sec of 2052 bytes therefore has nine and half sequences in the user data direction Q. Since the EDC 505 of 4 bytes is placed at the end of the user data 504 of 2048 bytes in each sector Sec, if a sector number of the first sector is 0 (Sec 0), the EDC 505 in an even number sector is placed at the middle of one sequence in the user data direction Q.

FIG. 23 is a view showing an encoding order of each data for generating RUB from user data and address information. An LDC cluster and a BIS cluster are generated separately. An LDC cluster D6 is generated as follows. Firstly, Step SP1 adds EDC to user data D1 to create data frame D2. The addition of EDC is performed for each sector Sec and a sector of 2052 bytes added with EDC is obtained by performing a predetermined operation on a sector having the user data of 2048 bytes and 0 data of 4 bytes sequentially in the user data direction Q.

Then, Step SP 2 performs scrambling on EDC added data (data frame) D2 to which EDC has been added to create scrambled data (scrambled data frame) D3. The scrambling performs a predetermined arithmetical operation on data of one sector having 2052 bytes which is added with EDC in the user data direction Q. After that, Step SP3 rearranges the rows and columns of the scrambled data D3 to create a data block D4. Then, Step SP4 adds ECC parity to the data block D4 to create an LDC block D5. Finally, Step SP5 performs the interleaving as described above on the LDC block D5, thereby creating an LDC cluster D6.

On the other hand, a BIS cluster D11 is generated as follows. Firstly, Step SP6 interleaves user control data D8 and Step SP7 adds ECC to an address unit number D7 and interleaves the data to create an access block D9 from these data.

Then, Step SP8 adds BIS ECC to the access block D9 to create a BIS block D10. Finally, Step SP9 interleaves the BIS block D10, thereby creating a BIS cluster D11.

After that, Step SP10 combines the LDC cluster D6 and the BIS cluster D11 to create an ECC cluster D12. Step SP11 adds a synchronization signal (frame sync) and a DSV control bit to the ECC cluster D12 to create a physical cluster D13. Then, Step SP12 adds run-in and run-out to the physical cluster D13 and performs 17PP modulation, thereby creating RUB D14 that contains 495 recording frames $D14_3$ together with run-in $D14_1$ and run-out $D14_2$ that are placed at the beginning and end of the recording frames.

FIG. 24 is a diagram showing a scrambler circuit for performing scrambling in Step SP2. The 32 bits from PS0 to PS31 shown in FIG. 24 indicate physical sector numbers. The physical sector number is a physical address for a sector of data 2 KB and has 4 bytes (32 bits). Upon reading and writing with 1 cluster of 64 KB constituting 1 RUB, 32 physical sector numbers are allocated to one cluster. Of the 32 bits physical sector numbers, 15 bits from PS5 to PS19 are cluster numbers (cluster address CN in units of RUB).

The scrambler circuit 601 includes a shift register 602 of 16 bits according to the multinomial below and XOR circuits 603 to 605.

$$\Phi(x)=X16+X15+X13+X4+1$$

S0 to S15 indicate the data retained in the shift register 602, which is referred to herein as the 16-bit shift register value. The shift register 602 shifts the value of data Sj to S(j+1) where j=0 to 14 each clock of a shift clock CKs. When scrambling, at the beginning of data block (RUB) to be scrambled, data S0 to S15 is loaded to the shift register 602 according to the parallel load signal PL. In this case, as data S0 to S14, the values of PS5 to PS19 in the physical sector number are loaded and preset as scrambling initial values in each sector. The physical sector number that is preset in this manner is the first physical sector number in the cluster. A fixed value "1" is loaded as a scrambling initial value of data S15.

In this way, as data S0 to S15 of the shift register 602, the cluster number in the physical sector number is preset as a scrambling initial value. At this time, the first low order 8 bits S0 to S7 serve as a first scrambling byte, which is referred to herein as the scramble value.

The shift register 602 outputs the low-order 8 bits of the 16-bit shift register value that has been shifted by 8 bits from the scrambling initial value by the shift clock as a scramble value (Sk) in synchronization with the timing to make 1-byte input (Dk) in the user data direction Q. Scrambled data D'k that is the data after scrambling the user data is calculated by exclusive OR operation of the input data Dk and the scramble value Sk output at Dk input timing.

$$D'k=Dk \text{ xor } Sk \ (k=0, 1, \ldots 2051)$$

where xor represents exclusive OR operation.

The scrambling obtains the scrambled data D'k from the scramble value Sk that is obtained by the shift register 602 and the data Dk of 2052 bytes in the user data direction Q that constitutes the sector Sec shown in FIG. 22.

A reproducing apparatus for Blu-ray disc that is formatted as described above is disclosed in Japanese Unexamined Patent Application Publication No. 2004-192749. FIG. 25 is a block diagram showing a conventional reproducing apparatus described therein. A disc 701 is driven to rotate at constant linear velocity (CLV) by a spindle motor 752 during recording and reproducing operation. Then, an optical pickup (optical head) 751 carries out the recording or reproduction of data on the disc 701.

The pickup 751 has a laser diode that serves as a laser light source, a photo-detector for detecting reflected light, and an objective lend that serves as an output end of laser light to create an optical system that applies laser light to a disc recording surface through the objective lens and guides reflected light to the photo-detector, through not shown. The pickup 751 is movable in the disc radius direction by a thread mechanism 753. The laser diode outputs blue laser with the wavelength of 405 nm. The NA of the optical system is 0.85 and the laser emission is controlled by a drive signal (drive current) from a laser driver 763. The reflected light information from the disc 701 is detected by the photo-detector and changed into an electrical signal according to detected light intensity, and then supplied to a matrix circuit 754.

The matrix circuit 754 has a current-voltage converter and a matrix operating/amplifying circuit corresponding to the output current from a plurality of photo-receiving devices as the photo-detector and generates a necessary signal by matrix operation. For example, it generates a high-frequency signal corresponding to reproduction data (reproduction data signal), a focus error signal for servo control, a tracking error signal, a push-pull signal related to wobbling groove and so on.

The reproduction data signal that is output from the matrix circuit 754 is supplied to a reader/writer circuit (RW circuit) 755, the focus error signal and the tracking error signal are supplied to a servo circuit 761, and the push-pull signal indicating detection information of wobbling groove is supplied to a wobble circuit 758.

The push-pull signal related to wobbling groove that is output from the matrix circuit 754 when the disc 701 is a rewritable disc is processed by the wobble circuit 758. The wobble circuit 758 performs MSK demodulation and HMW demodulation on the push-pull signal indicating ADIP information so as to demodulate the signal into data stream constituting ADIP address and supplies the data stream to an address decoder 759. The address decoder 759 generates a clock by PLL processing using the wobble signal supplied from the wobble circuit 758, and supplies it to each component as an encode clock for recording, for example.

In the recording, recording data is transferred from an AV system 720 and sent to memory in an ECC/scrambling circuit 757 for buffering. In this case, the ECC/scrambling circuit 757 performs processing such as addition of an error correction code, scrambling and addition of sub-code to encode the buffered recorded data. ECC encoding and ECC decoding are the process correspond to ECC format which uses reed Solomon (RS) code with RS (248, 216, 33), code length 248, data 216, and distance 33. The data after ECC encoding and scrambling is then modulated in RLL(1-7)PP system by a modulation/demodulation circuit 756 and supplied to the reader/writer circuit 755. An encode clock that serves as a reference clock for the encoding process during recording is a clock generated from the wobble signal described above.

The reader/writer circuit 755 performs recording compensation processing such as fine adjustment of an optimum recording power for the characteristics of a recording layer, the spot shape of laser light, a recording linear velocity and so on and adjustment of a laser drive pulse waveform on the recording data that is generated by the encoding process. The recording data is then sent to the laser driver 763 as a laser drive pulse. The laser driver 763 applies the laser drive pulse to the laser diode in the pickup 751 to drive the laser emission.

The pit (phase change mark) corresponding to the recording data is thereby formed on the disc 701.

A spindle servo circuit 762 controls a spindle motor 752 to make CLV rotation. The spindle servo 762 acquires the clock generated by PLL processing for a wobble signal as present rotational speed information of the spindle motor 752 and compares it with predetermined CLV reference speed information, thereby creating a spindle error signal.

The operations of the servo system and the recording and reproducing system as described above are controlled by a system controller 760 that is configured by a micro computer. The system controller 760 performs various operations according to a command from the AV system 720. For example, if the AV system 720 outputs a write command, the system controller 760 first moves the pickup 751 to an address to which data is to be written. Then, the system controller 760 controls the ECC/scrambling circuit 757 and the modulation/demodulation circuit 756 so as to perform the encoding processing as described above on the data transferred from the AV system 720, which is video data of various formats such as MPEG2 and audio data, for example. Then, a laser drive pulse from the reader/writer circuit 755 is supplied to the laser driver 763, thereby conducting recording. In the recording or reproducing of the data, the system controller 260 controls access or recording and reproducing operation by using the ADIP address detected by the address decoder 759 or the address contained in BIS.

The above technique, which is disclosed in Japanese Unexamined Patent Application Publication 2004-192749, aims at providing ROM medium or the like that has superior RAM compatibility and takes advantages in tracking servo by scrambling the linking data (run-in and run-out) of Blu-ray disc with the same process as the main data (user data).

Referring back to FIG. 22, the EDC 505 that is added to each sector is obtained by performing a predetermined operation on each sector sequentially in the user data direction Q. Further, the scrambling circuit 601 shown in FIG. 24 outputs scramble value Sk for the sequence in the user data direction Q for each sector of 2052 bytes added with EDC. Thus, in the scrambling processing, scrambled data is obtained sequentially in the user data direction Q.

On the other hand, the direction of recording data on a disc is the recording frame direction P and therefore it is necessary to modulate data in the order of the direction P. It is thus required to rearrange the data sequence from the user data direction Q to the recording frame direction P at least before the modulation.

The EDC 505 described above is added to the end of user data, and it is placed at the middle of the user data direction Q in an even number sector. Thus, when transferring the data added with EDC to the recording frame direction P, for example, it is necessary in an even number sector to transfer EDC before all data is completed. However, since the EDC 505 is obtained by performing a predetermined operation on user data of one sector, it is normally impossible to obtain the EDC 505 when there is a lack of user data. Further, in the scrambling process, a scramble value is calculated in the sequence of the user data direction Q on the EDC-added data of each sector. Therefore, in obtaining scrambled data in the sequence of the recording frame direction P, that is, when performing scrambling in the order of the recording frame P, user data is input to the scrambler circuit 101 at a rate of 1 bytes in 216 bytes (once in 216 times). In an odd number sector, the first folded point is at 108th byte.

Accordingly, it is required to perform encoding processing such as EDC addition, scrambling and ECC addition in advance and then transfer data in the recording frame direction. If the user data after the encoding processing such as EDC addition, scrambling and ECC addition is buffered in data buffer in the ascending order of address, transferring data in the recording frame direction requires an access to the addresses of every 216 bytes, for example, thus requiring a data buffer that is capable of random access.

As described above, in Blu-ray disc, it is necessary to transfer data in the recording frame direction P that is different from the user data direction Q along which the EDC creation and the scrambling are performed. This at least requires the process of performing EDC addition and scrambling (path S1) on user data of 1RUB as a recording unit and then reading the data arranged in the user data direction Q in the recording frame direction P (path S2). Since the configuration requires encoding with 2 paths, the data buffer needs to have the capacity of at least 2 clusters, each cluster having 75391 bytes, including EDC and ECC.

Such a data buffer is normally configured by memory. If a data buffer is configured by a memory unit capable of high-speed random access such as SRAM, it allows data supply at high transfer rate in spite of random access; however, it results in significant cost increase, thus being impractical.

On the other hand, if a data buffer is configured by a memory unit that is low cost but unsuitable for high-speed random access such as DRAM, it is unable to make high-speed random access and thus hinders high-speed recording. Configuring a memory with DRAM fails to attain a data transfer rate that allows high-speed recording due to random access, thus being incapable of high-speed recording. Further, though use of a memory capable of burst transfer such as synchronous DRAM (SDRAM) allows high-speed transfer of data to a certain degree for sequential addresses, since data transfer in the recording frame direction P requires high-speed random access, it also fails to achieve high-speed recording.

SUMMARY OF THE INVENTION

In view of the foregoing, according to an aspect of the present invention, there is provided an encoding device for performing a prescribed operation on user data and outputting operated data, which includes an operation value storage unit for storing a first sequence operation result after performing a prescribed operation on user data of a first sequence, a substitution buffer for outputting a second sequence data including the user data in a second sequence different from the first sequence, and a second sequence operation unit for performing a prescribed operation on the second sequence data according to the first sequence operation result stored in the operation value storage unit and outputting the operated data in the second sequence.

This configuration rearranges data including user data into second sequence data by the substitution buffer and uses a first sequence operation result stored in the operation value storage unit, thereby outputting operated data in the second sequence.

According to another aspect of the present invention, there is provided an encoding method for performing a prescribed operation on user data and outputting operated data, wherein the method performs in parallel a first processing for performing a prescribed operation on user data of a first sequence and storing an operation result, and a second processing for performing a prescribed operation on the user data in a second sequence different from the first sequence from the user data of the first sequence and the operation result and converting the data into the operated data.

This method performs in parallel the first processing for obtaining an operation result and the second processing for converting user data into operated data by using the operation result obtained in the first processing, thereby converting the user data input in the first sequence into the second sequence different from the first sequence and outputting operated data.

According to still another aspect of the present invention, there is provided a scrambler circuit for performing scrambling on data with error detection code that is user data added with an error detection code, which includes a converter for outputting a conversion scramble value in a second sequence by using a first sequence operation portion for calculating a scramble value in a first sequence different from the second sequence and an operation unit for calculating scrambled data from the data with error detection code input in the second sequence and the conversion scramble value.

This configuration uses a scramble value in the first sequence that is calculated by the first sequence operation portion that performs scrambling in the first sequence by converting it into the second sequence, thereby enabling scrambling by using the first sequence operation portion on data added with an error detection code that is input in the second sequence.

The present invention enables scrambling and encoding suitable for achieving high-speed recording by suppressing a decrease in transfer rate due to random access to mass data.

BRIEF DESCRIPTION OF THE DRAWINGS

The above and other objects, advantages and features of the present invention will be more apparent from the following description taken in conjunction with the accompanying drawings, in which:

FIG. 3 is an enlarged view of first two sectors Sec 0 and Sec 1 of 32 sectors shown in FIG. 2;

DESCRIPTION OF THE PREFERRED EMBODIMENTS

The invention will be now described herein with reference to illustrative embodiments. Those skilled in the art will recognize that many alternative embodiments may be accomplished using the teachings of the present invention and that the invention is not limited to the embodiments illustrated for explanatory purposed.

An embodiment of the present invention is described hereinafter in detail with reference to the drawings. The embodiment applies the present invention to an encoding device and an recording apparatus that enable high-speed recording on an optical disc. Although the following description is given on a case of using Blu-ray disc as an example of an optical disc and conducting encoding according to physical specifications of Blu-day standards if necessary, it is not limited thereto and the present invention may be applied to an encoding device and a recording apparatus for discs other than Blu-ray disc.

Further, though the following description is given on a recording apparatus that is characterized by the process of at least generating scrambled data from user data particularly in the encoding of user data and in Blu-ray disc, it is feasible to combine the recording apparatus with a reproducing apparatus as a recording and reproducing apparatus. Furthermore, a scrambler circuit that is applied to the encoding device in the following embodiment is not limited to the application to the encoding device. It may be also applied to a de-scrambler circuit in an encoding device of another configuration or a reproducing apparatus for Blu-ray disc or the like.

First Embodiment (1) Overview of an Encoding Device

Figure 1:
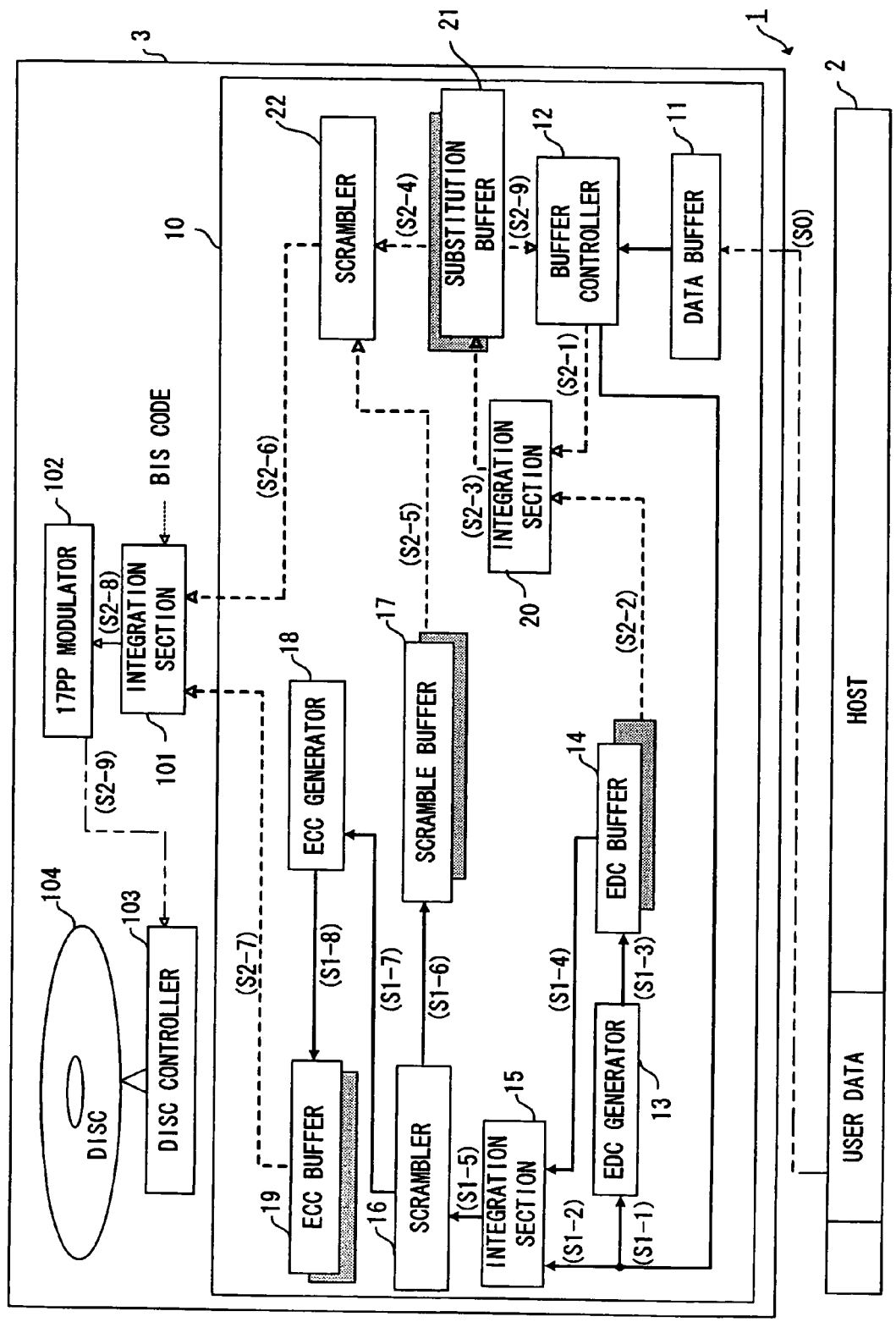
FIG. 1 is a diagram showing a disc encoding device and a recording system including the same according to a first embodiment of the invention.

FIG. 1 is a diagram showing a disc encoding device and a recording system including the disc encoding device according to a first embodiment of the present invention. Referring to FIG. 1, the recording system 1 includes a storage unit 3 and a host 2 for transferring user data to the storage unit 3. The host 2 may be an audio-visual (AV) system, a personal computer (PC) or the like, which indicates recording of user data or reading of data recorded on a disc to the storage unit 3.

The storage unit 3 includes an encoding device 10 for encoding user data, an integration section 101 for integrating additional information with the encoded user data as needed, a modulator 102 for modulating the data integrated by the integration section 101, a disc controller 103 for controlling the recording operation according to the modulated data, and a disc 104. The additional data integrated in the integration section 101 is address information (BIS) or the like if it is Blu-ray disc.

Figure 21:
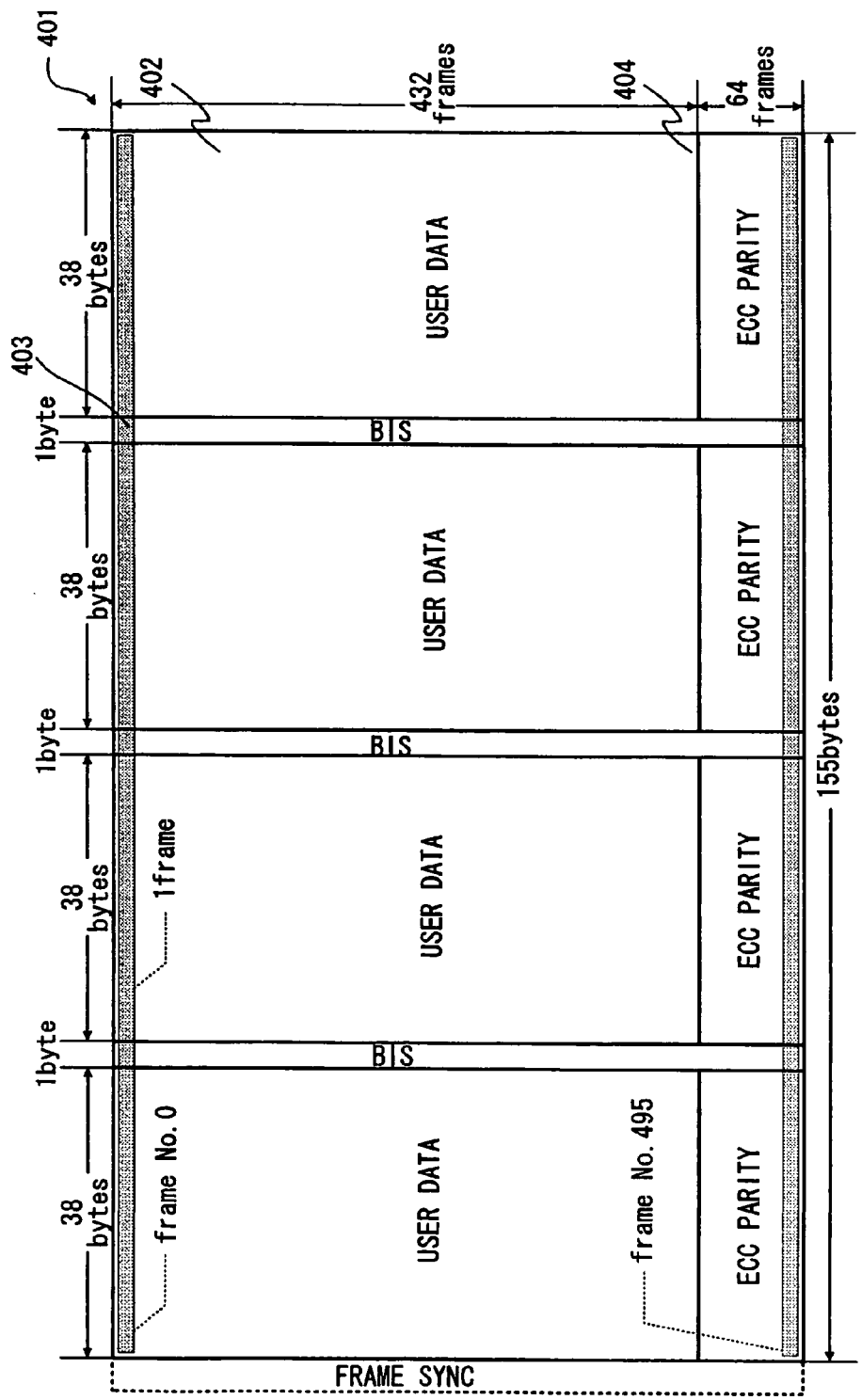
FIG. 21 is a diagram showing a format of an ECC cluster.

The encoding device 10 outputs operated data that is the data after processing pre-modulation processing such as EDC addition, scrambling and ECC addition on the user data transferred from the host 2. In the case of Blu-ray disc, the encoding device 10 outputs scrambled data (cf. D3 in FIG. 21) and ECC to the integration section 101. The integration section 101 rearranges the rows and columns of the scrambled data D3, adds ECC thereto and performs interleaving thereon, thereby creating an ECC cluster (cf. D6 in FIG. 21).

Figure 23:
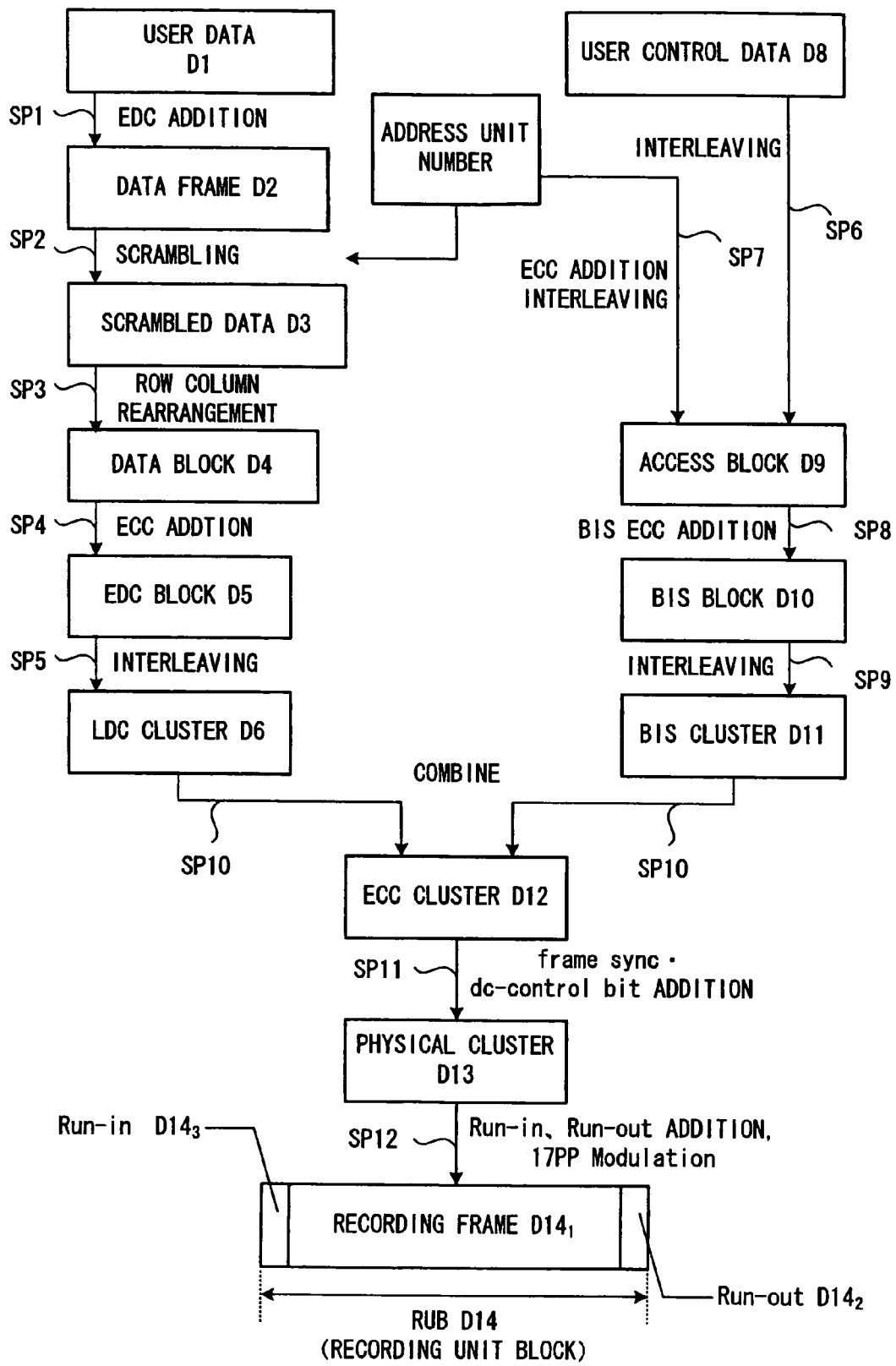
FIG. 23 is a view showing an encoding process of each data for creating RUB from user data and address information.
Figure 24:
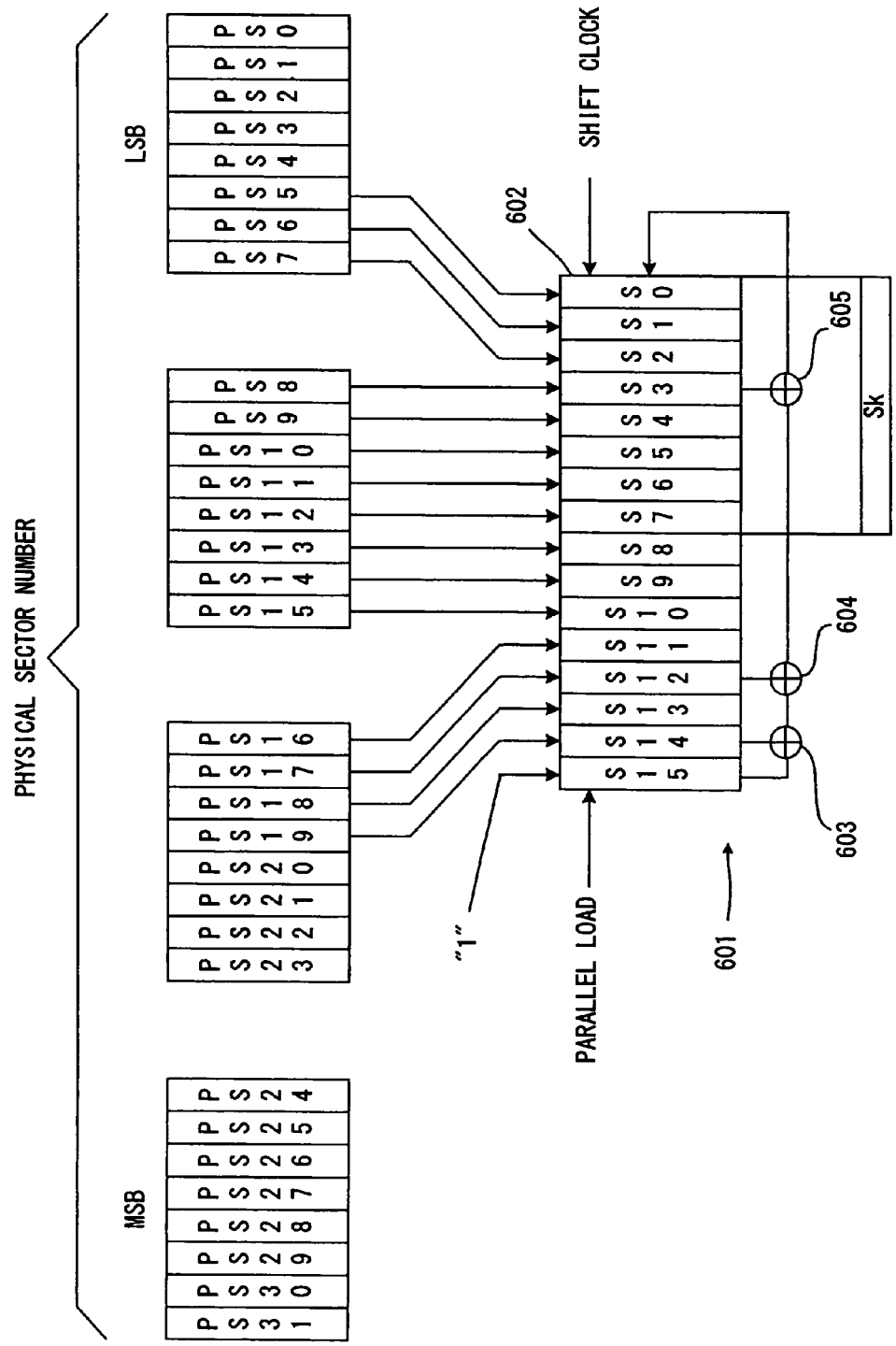
FIG. 24 is a diagram showing a scrambler circuit for scrambling.
Figure 25:
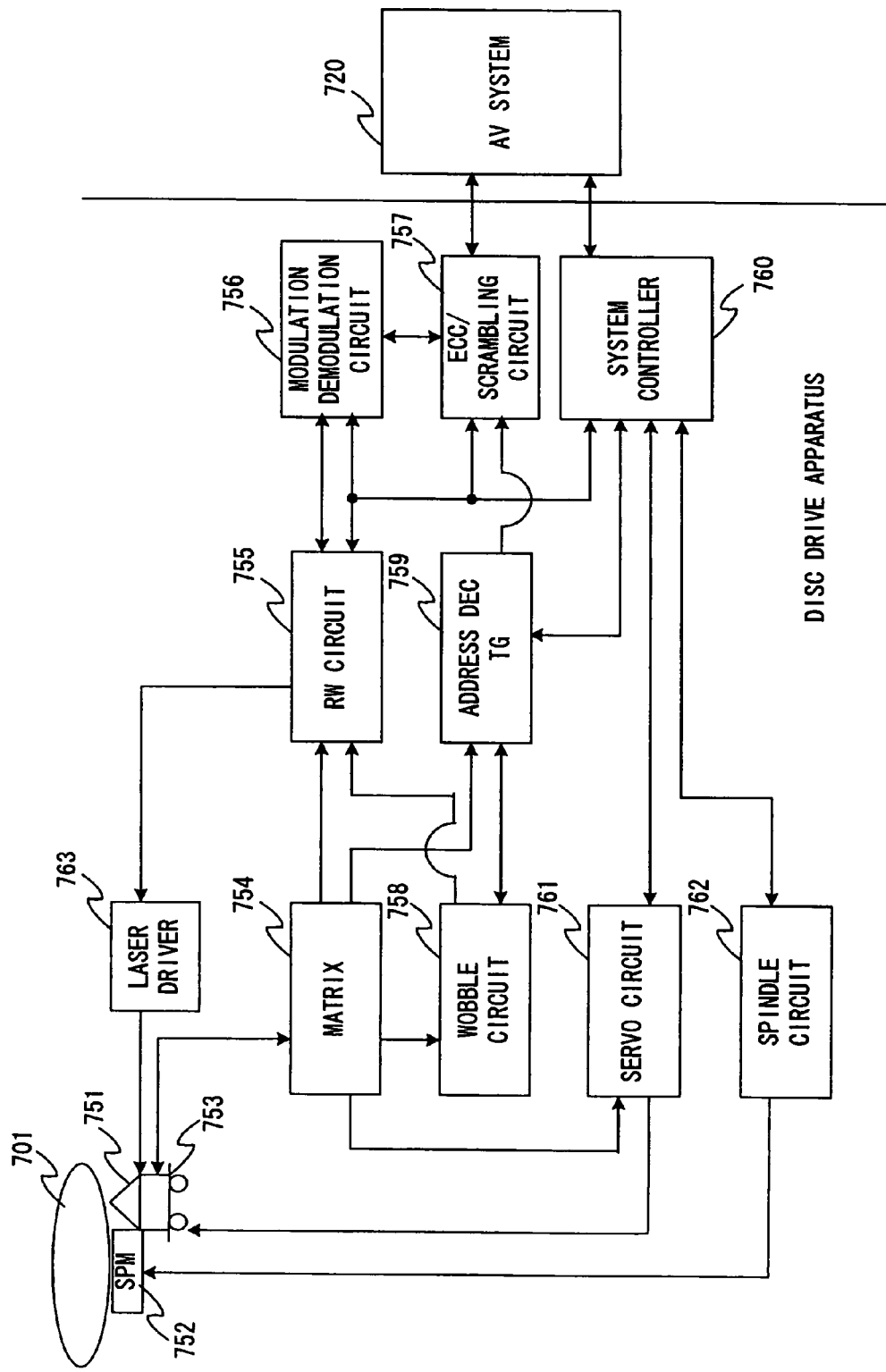
FIG. 25 is a block diagram showing a conventional reproducing apparatus described in Japanese Unexamined Patent Application Publication No. 2004-192749.

On the other hand, another encoding device for generating BIS, which is a BIS encoding device, generates an access block (cf. D9 in FIG. 23) from user control data and an address unit number (cf. D7 and D8 in FIG. 23) and also generates BISECC (cf. D10 in FIG. 23). Then, the BIS encoding device supplies the access block and the BISECC to the integration section 101 to generate a BIS block (cf. D10 in FIG. 23) and further interleave the BIS block to create a BIS cluster (cf. D11 in FIG. 23). Then, it combines the LDC cluster and the BIS cluster to create an ECC cluster (cf. D12 in FIG. 23), further adds a frame sync and DSV control bit thereto to create a physical cluster (cf. D13 in FIG. 23), and supplies the physical cluster to the modulator 102.

The modulator 102 performs 17PP modulation on a recording frame and adds run-in and run-out thereto to create a recording unit block RUB (cf. D14 in FIG. 23) and then supplies it to the disc controller 103. The disc controller 103 executes recording of data onto the disc 104 in recording units of RUB.

The encoding device 10 includes a data buffer 11, a buffer controller 12, an EDC generator 13, an EDC buffer 14, an integration section 15, a scrambler 16, a scramble buffer 17, an ECC generator 18, an ECC buffer 19, an integration section 20, a substitution buffer 21, and a scrambler 22. The ECC from the ECC buffer 19 and the scrambled data from the scrambler 22 are supplied to the integration section 101 described above.

The data buffer 11 buffers the user data transferred from the host 1, and the buffer controller 12 controls the readout of data from the data buffer 11. The EDC generator 13 generates EDC from the user data read out from the buffer controller 12, and the EDC buffer 14 temporarily stores the EDC generated by the EDC generator 13. The integration section 15 integrates the user data from the data buffer 11 and the EDC stored in the EDC buffer 14. The scrambler 16 scrambles the data added with EDC, which is referred to herein as the EDC-added data, and the scramble buffer 17 stores the scramble value generated by the scrambler 16. The ECC generator 18 generates ECC from the data scrambled by the scrambler 16, which is referred to herein as the scrambled data, and the ECC buffer 19 temporary stores the ECC generated by the ECC generator 18.

The integration section 20 reads the EDC stored in the EDC buffer 14 at a predetermined timing and adds it to the user data read out from the data buffer 11 by the buffer controller 12 to create EDC-added data. The substitution buffer 21 temporarily stores the EDC-added data integrated by the integration section 20. The scrambler 22 scrambles the EDC-added data substituted by the substitution buffer 21 by using a scramble intermediate value, which is described later, stored in the scramble buffer 17 to generate scrambled data.

In this embodiment, the EDC generator 13, the integration section 15, the scrambler 16 and the ECC generator 18 constitute a first sequence operation unit to perform data processing in user data direction. The EDC buffer 14 the scramble buffer 17 and the ECC buffer 19 constitute an operation value storage. Either or both of the EDC buffer 14 and the ECC buffer 19 may be placed in the data buffer 11 as described later. Further, the scrambler 22 serves as a second sequence operation unit to perform data processing in recording frame direction P that is the direction of recording data on a disc by using the operation result in the first sequence operation unit. The buffer controller 12 and the integration section 20 serve as controllers for specifying a head address in burst transfer and controlling EDC readout timing from the EDC buffer 14.

The data buffer 11 in the encoding device 10 of this embodiment is configured by a memory that requires refresh and is capable of random access and burst transfer, such as SDRAM. The following description describes a case of using SDRAM. SDRAM is DRAM that is capable of higher speed access than random access when accessing to successive addresses, and use of burst transfer function allows high-speed data transfer. It is thereby possible to reduce costs compared with a memory capable of high-speed random access such as SRAM.

The substitution buffer 21, on the other hand, is configured by a memory that does not require refresh and is capable of random access. Though the following description describes a case of using SRAM, the substitution buffer 21 is not limited to SRAM as long as it is capable of high-speed random access. The substitution buffer 21 is placed to substitute the data in the user data direction Q with the data in the recording frame direction P, and it is capable of transferring the EDC-added data in the recording frame direction P at high speed. If a disc is Blu-ray disc, data is encoded with one recording unit as a processing unit. The encoding process needs to perform EDC addition, scrambling and ECC addition in the user data direction Q (path S1) and then perform rearrangement of one recording unit and data transfer in the recording frame direction P (path S2). Thus, since a high-cost memory capable of high-speed random access, such as SRAM, normally performs the processing of data in one recording unit, which is the processing of the path S1 and the path S2 in parallel at the same time in practice, it has a memory capacity of two recording unit or larger.

On the other hand, the present embodiment repeats burst transfer of burst size data in the user data direction from the data buffer 11 so that the data is arranged in the recording frame direction, thereby reducing a memory capacity of the substitution buffer 21 to smaller than one recording unit.

The embodiment therefore uses a scramble intermediate value, which is described later, for scrambling on each recording frame. It is thereby possible to perform access and scrambling on each recording frame at high speed, thus achieving data encoding that allows high-speed recording at low cost by using SDRAM.

(2) Overview of Encoding Method

For easier understanding of the present invention, a problem caused by the use of SDRAM is described hereinafter together with a disc format and an overview of the present invention. In the following description, user data is arranged in ascending order of address in the user data direction P and stored temporarily into the data buffer 11 such as SDRAM from the head data thereof.

In the case where the sequence of encoding process including EDC addition, scrambling and ECC addition and the sequence of recording data on a disc are different such as Blu-ray disc, it is necessary to perform the processing such as EDC addition, scrambling and ECC addition and then transfer the processed data in the recording frame direction. The encoding technique that involves two divided stages is referred to herein as encoding of two path configuration. The encoding of generating additional data such as EDC and ECC is referred to as the path S1, and the data transfer in the actual recording frame direction is referred to as the path S2.

When performing the encoding of recording data on Blu-ray disc, the encoding process to change the user data into pre-modulation data requires a first step (path S1) for generating EDC and ECC in the user data direction Q and a second step (path S2) for transferring user data or the like in the recording frame direction P.

Figure 2:
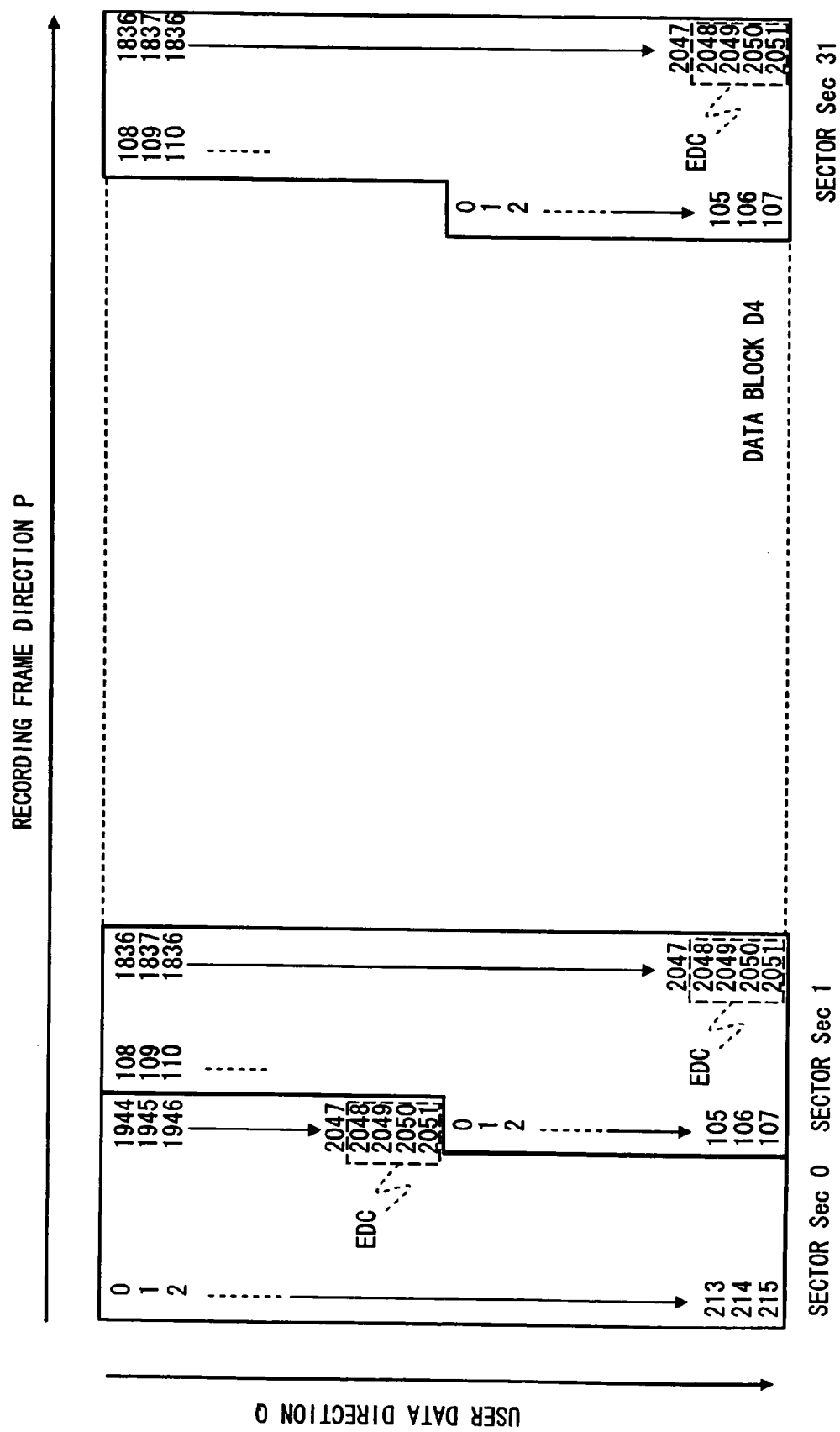
FIG. 2 is a view to describe a sequence of data in units of bytes in a data block in Blu-ray disc.

FIG. 2 is a view to describe the arrangement sequence of data in units of bytes contained in a data block of Blu-ray disc. The data block D4 includes 32 sectors. One sector is composed of 2052-byte data where 4-byte EDC is added to 2048-byte user data. FIG. 3 is an enlarged view of two sectors Sec 0 and Sec 1. The values shown therein indicate the sequence of user data direction Q in units of bytes. The data block D4 contains 304 columns and 216 rows. In FIG. 3, C indicates a column number ($0 \leq C \leq 303$) and R indicates a row number ($0 \leq R \leq 215$).

In each sector, 216 bytes are arranged in a column and successively in the next column. Thus, in the sector 0, for example, C=9th column has 1944th to 2051st byte data, which occupies R=0th to 107th rows. The R=108th to 215th rows in the C=9th column are occupied with 0th to 107th byte data of the Sec 1. In this way, the data block D4 are arranged so that an even number sector and an odd number sector form one unit, which is referred to herein also as the area. In other words, the data is arranged repeatedly in the same sequence in every two sectors (areas) composed of 19 columns.

In the sectors Sec 0 to Sec 31, a prescribed operation is performed on user data in the user data direction Q shown in FIGS. 2 and 3 for EDC addition and scrambling. The user data is then modulated and recorded on a disc. When recording, the data in the data block is recorded in the sequence of the recording frame direction P indicated by the arrow in FIG. 2, which is perpendicular to the column direction as the user data direction Q.

The user data direction Q is a processing sequence of error detection code addition and a processing sequence of scrambling in Blu-ray disc. When reproducing data, descrambling and EDC detection are performed also in the user data direction Q. The recording frame direction P is a sequence of recording data on Blu-ray disc. Further, in reproduction, data is read out from the disc 104 in the recording frame direction P.

The EDC generator 13 is configured by a shift register that generates 4 bytes of EDC upon input of 2048 bytes of user data and 4 bytes of 0 data in the user data direction Q. The scrambling processing, which is executed in the scrambler 16 after that, performs a prescribed operation in each sector containing EDC-added data in the user data direction Q, thereby creating scrambled data.

As described above, in Blu-ray disc, the sequence of recording and reproducing on a disc and the sequence of performing EDC addition, scrambling and so on are different. Thus, it is necessary to perform the processing such as EDC addition and scrambling in the user data direction Q and then perform the processing such as modulation, recording or reading and demodulation in the recording frame direction P on one data block included in RUB as one recording unit.

Figure 4:
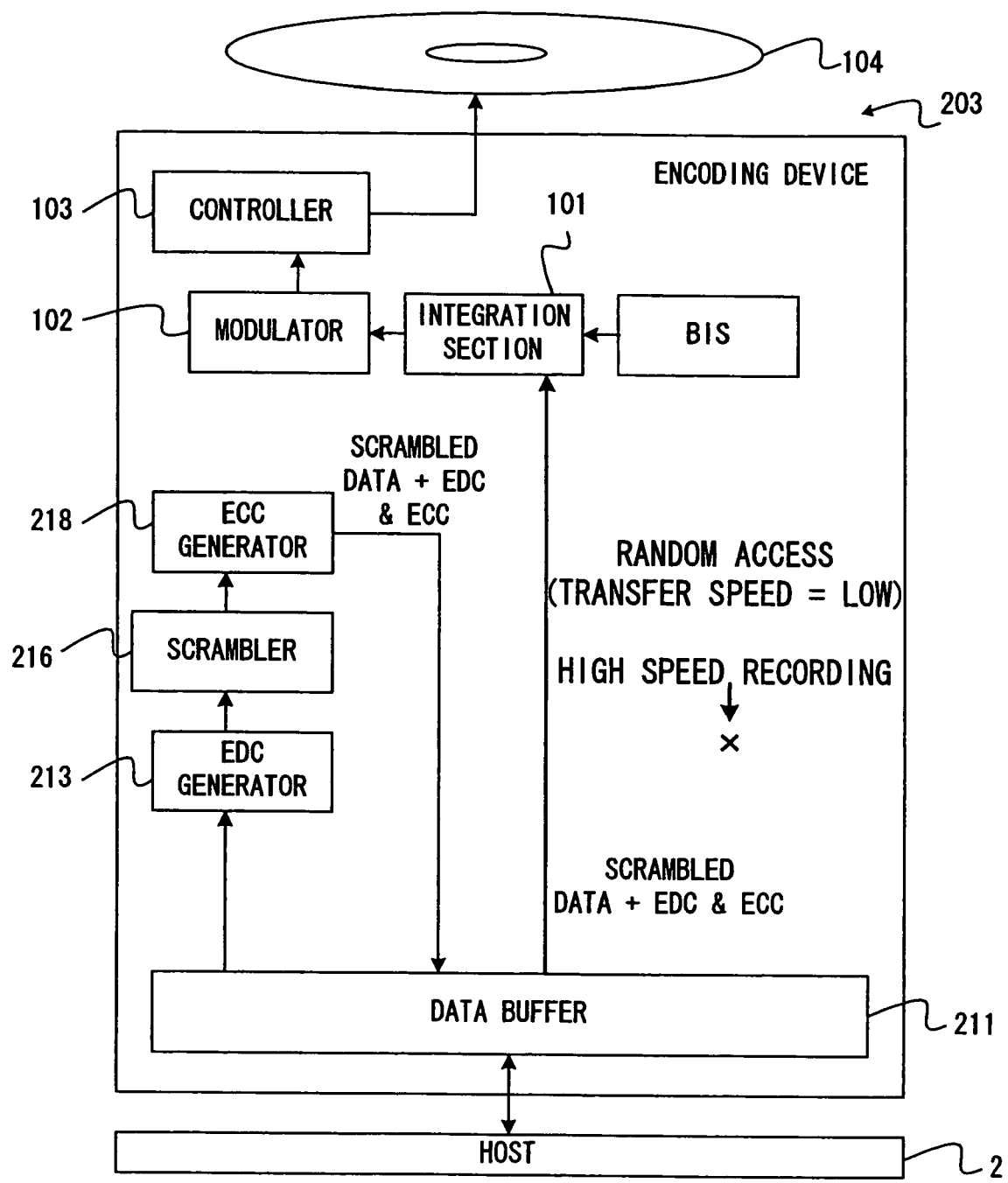
FIG. 4 is a diagram showing a recording system according to a reference example 1.
Figure 5:
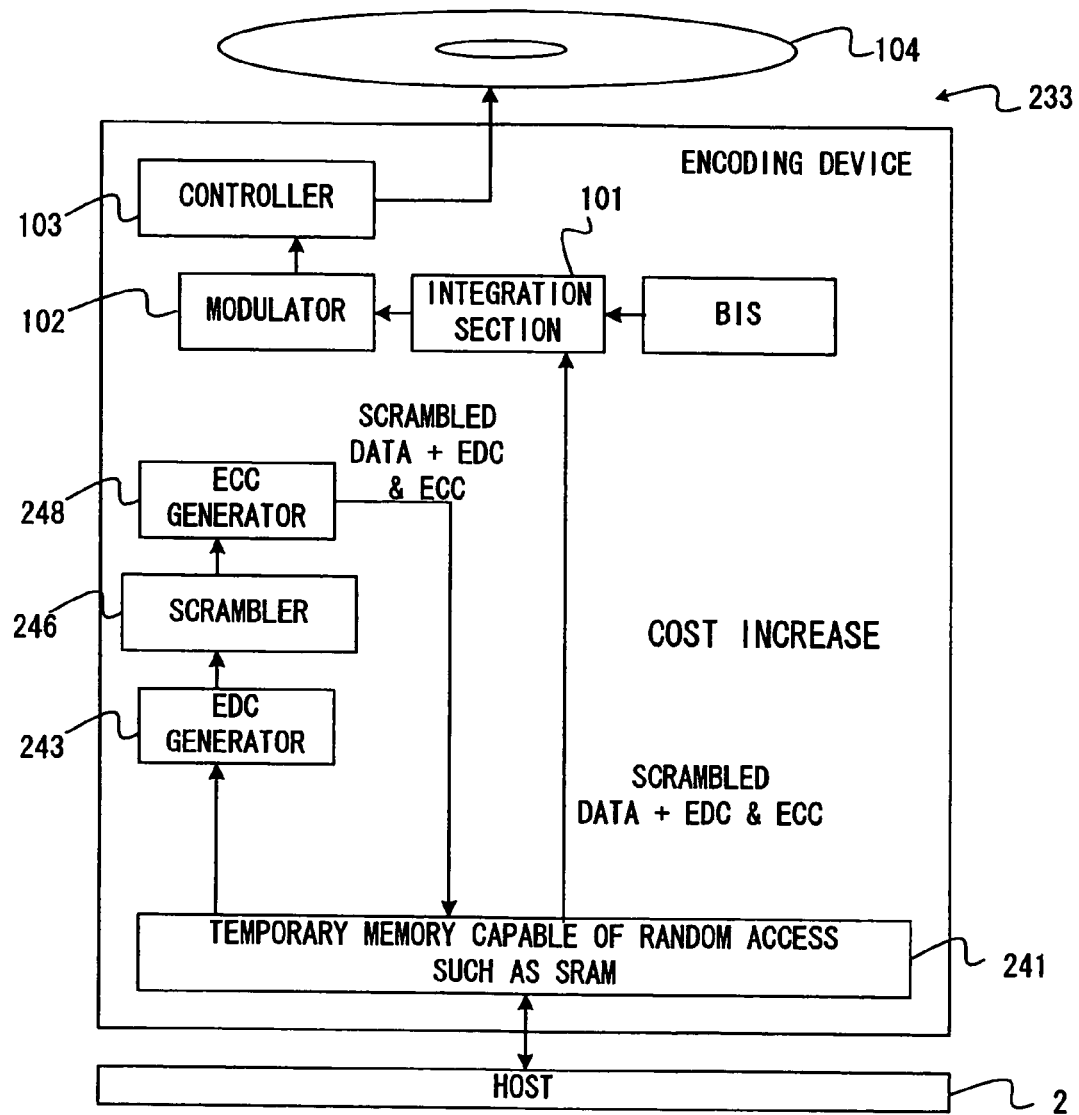
FIG. 5 is a diagram showing a recording system according to a reference example 2.
Figure 6:
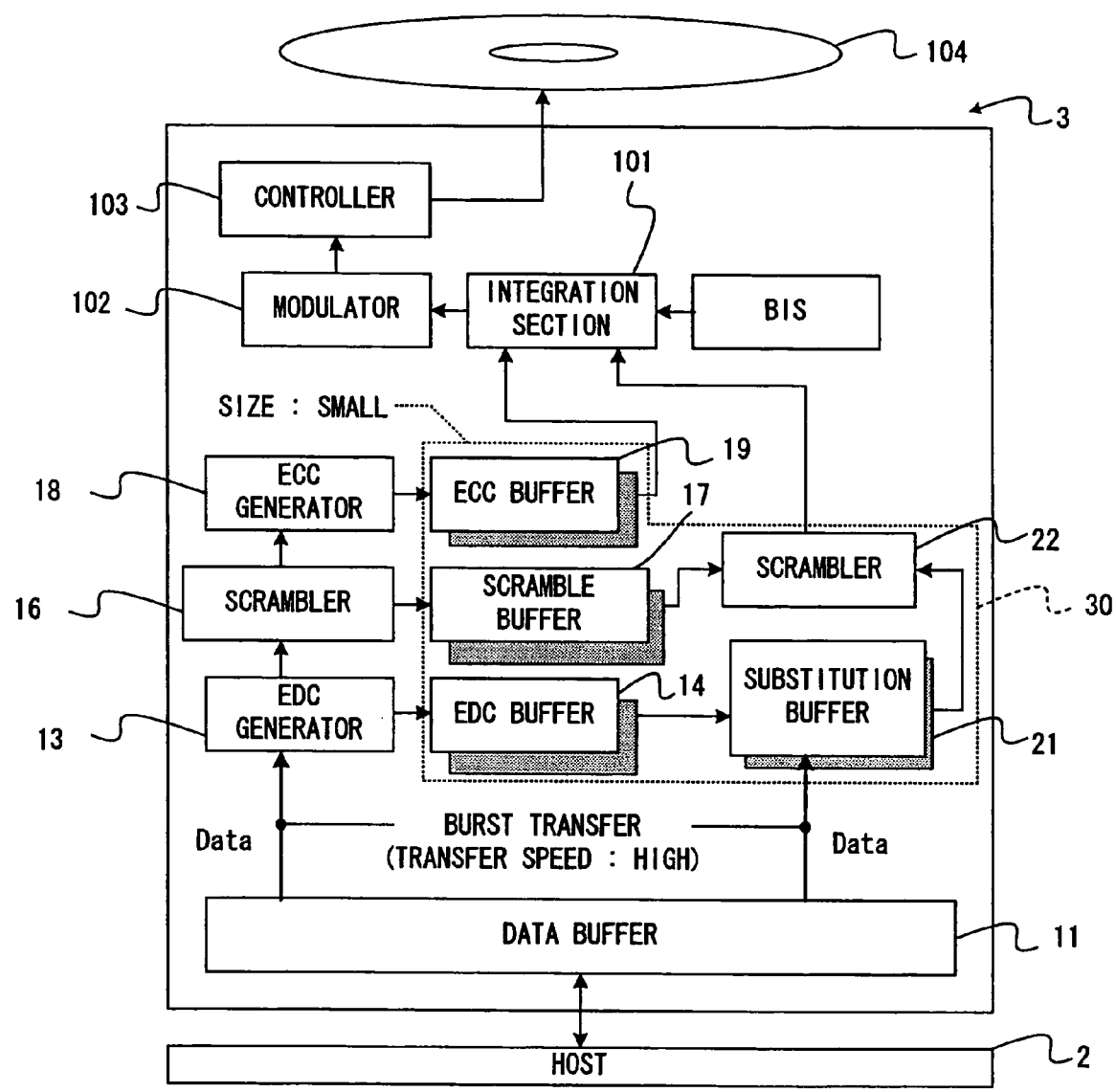
FIG. 6 is a diagram showing the recording system according to the first embodiment in comparison with FIGS. 4 and 5.

FIGS. 4 and 5 are diagrams showing an example of a recording system capable of executing the above processing, which is referred to herein as the reference examples 1 and 2. FIG. 6 is a diagram showing a recording system according to this embodiment in comparison with FIGS. 4 and 5. FIG. 6 shows a part of the optical disc system 1 of this embodiment which is shown in FIG. 1.

Normally, an encoding device for data with Blu-ray standards having the above format may be configured as the reference example 1 shown in FIG. 4. Specifically, as shown in FIG. 4, the user data in the user data direction Q that is sent from the host 2 is stored in SDRAM 211 serving as a data buffer in units of 1 RUB. Then, the user data is read out per sector, added with EDC by the EDC generator 213, scrambled by the scrambler 216, further added with ECC by the ECC generator 218 and finally read back to the SDRAM 211. Since all data is input in the user data direction Q in EDC addition, scrambling and ECC addition processing, the data can be processed in succession.

On the other hand, data is recorded on the disc 104 in the recording frame direction P that is different from the user data direction Q. Thus, it is necessary to rearrange the data into the recording frame direction P at least before modulation. However, since the scrambler 216, for example, performs scrambling on every 1 byte in the user data direction Q, if the head byte of the user data direction Q is byte 0, processing of data in the recording frame direction P requires a byte column of the user data direction Q every 216 bytes, such as byte 0, byte 216, byte 432 and so on. If one sector contains byte 0 to byte 2051 as shown in FIG. 2, data sequence is folded at 216th byte and a head column of an even number sector is byte 108.

Specifically, when transferring scrambled data to the integration section 101 in the recording frame direction P, for example, the data of byte 216 that is required after byte 0 is obtained only after processing one column of data in the user data direction Q. It is therefore necessary to write the data that is processed in the user dada direction Q back to the SDRAM 211 by the amount corresponding to 1 RUB and read the data rearranged into the recording frame direction P, thus requiring random access to the SDRAM 211.

For the above reason, the data processed in the ECC generator 218 is written back to the SDRAM 211 as needed. In order to read out the data again in the recording frame direction P and transfer the data to the integration section 101, after the step (path S1) of writing back the scrambled data corresponding to 1 RUB, the step (path S2) of reading the data from the SDRAM 211 in the recording frame direction P is required. The processing of reading out the data that has been written back in the user data direction Q in the recording frame direction P is random access. However, the SDRAM 211 is incapable of high-speed random access. Even if the path S1 and the path S2 are processed in parallel, for example, it is unable to increase the processing speed of transferring the ECC-added data in the recording frame direction P.

As described above, if the data buffer is configured by the SDRAM 211, the data transfer speed in the recording frame direction is too slow to execute high-speed recording. One approach to overcome this drawback is to configure the data buffer not by DRAM but by a temporary memory capable of high-speed random access, such as SRAM, which is referred to herein as the SRAM 241. The SRAM 241 also requires a memory area used for the step of path S1 and a memory area used for the step of path S2, and thus a memory area for storing data corresponding to two recording units is needed. Since a memory area for transferring user data from the host 2 is needed in practice, it is necessary to secure a memory area of at least three recording units. Making such a large memory area in SRAM significantly increases a cost, which is thus not practical.

In view of the above, the present embodiment provides an optical disc system that enables high-speed data transfer while suppressing a cost increase by minimizing a high-cost memory capable of high-speed random access. To this end, this embodiment uses the data buffer 11 configured by SDRAM or the like, which is the same as in FIG. 4, as a memory for temporarily storing user data from the host 2 as shown in FIG. 6. While the data buffer 11 is incapable of high-speed random access, it is capable of burst transfer of certain amount of data to successive addresses. Though acquiring data successively by using the burst transfer or the like improves a transfer rate significantly, it is not suited to make high-speed random access as described with reference to FIG. 4.

On the other hand, the recording apparatus 3 according to this embodiment allows high-speed encoding with use of low-cost SDRAM or the like as the data buffer 11 by adding a relatively small size circuit, which is indicated by a dotted line 30.

The operation of the recording apparatus 3 is briefly as follows, though the detail is described later. First, it obtains the data where the data in the recording frame direction P is placed at the beginning, which is the data of every 216 bytes or 212+N bytes, by repeating burst transfer from the data buffer 11. Then, it stores the data obtained by the burst transfer into the substitution buffer 21 that is configured by SRAM or the like that is a temporary memory capable of high-speed random access and then acquires the data in the recording frame direction P to make data rearrangement. After that, it scrambles the rearranged data per recording frame with a scramble intermediate value of every 216 bytes (108 bytes). This configuration enables high-speed data transfer in the recording frame direction P, thus achieving a system compatible with high-speed recording. In Blu-ray disc, user data of one sector is has 2048 bytes, and N represents the number of data inserted between the data of each sector in the data buffer 11. In this embodiment, N=0 for simplification of the description.

(3) Operation of Encoding Device

Figure 7:
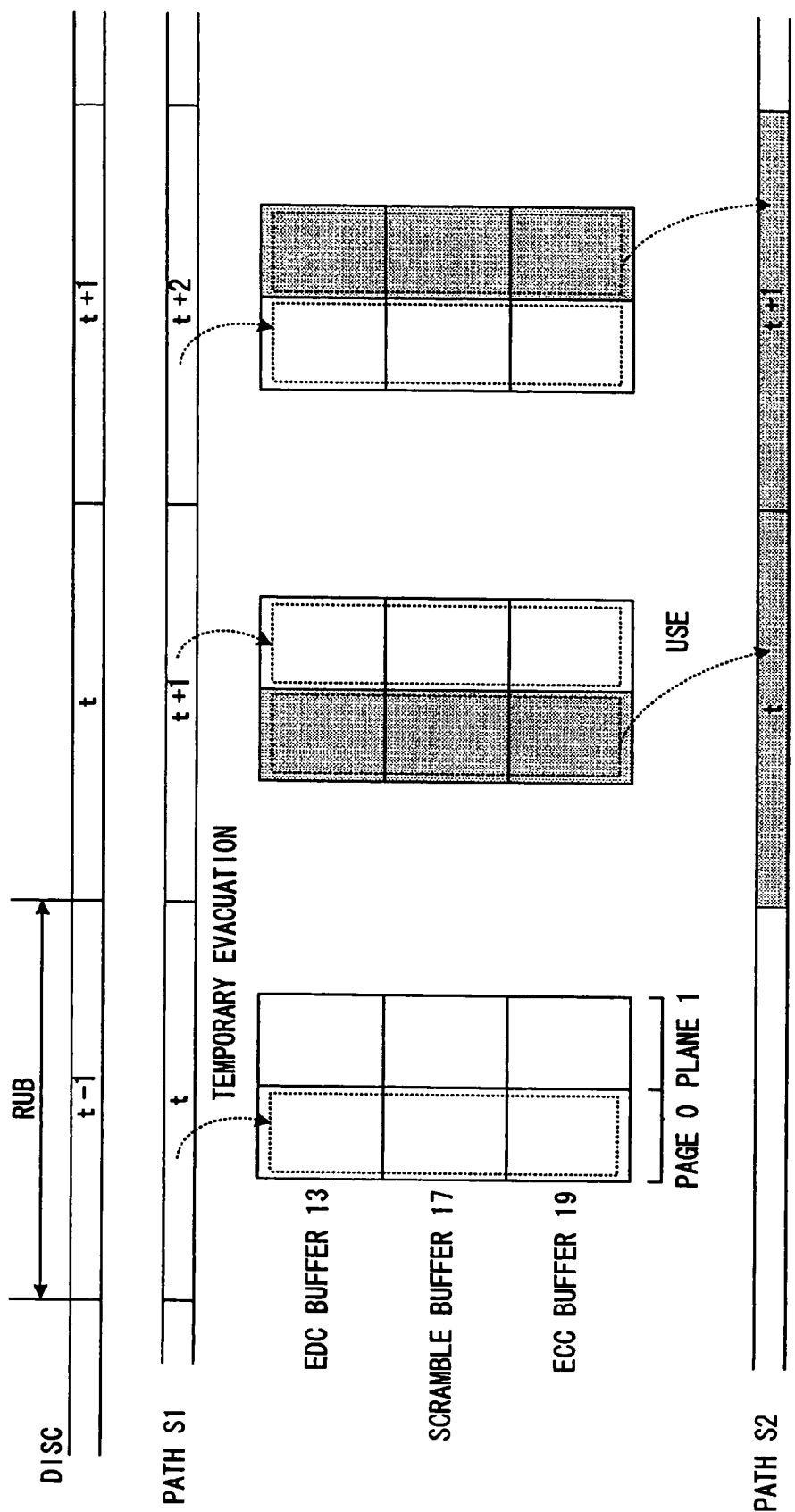
FIG. 7 is a view showing data processing timing in a path S1 and a path S2 according to the first embodiment of the invention.

The overview of the operation of the recording apparatus 3 according to the present embodiment is described below. FIG. 7 is a view showing a data processing timing in the path S1 and the path S2. As shown in FIG. 7, data is recorded on the disc 104 in recording unit of 1 RUB. While the user data contained in t-th RUB is processed by the path S1, the user data contained in (t-1)th RUB is processed by the path S2. Thus, the EDC buffer 14, the scramble buffer 17 and the ECC buffer 19 have two-plane configuration. The processing of the path S2 is performed based on the processing result of the path S1. In this way, the recording apparatus 3 performs the processing on the user data contained in the t-th RUB and the (t-1)th RUB in parallel, thereby encoding the user data contained in RUB in pipeline. The processing of the path S1 transfers the user data in the user data direction Q and the processing of the path S2 outputs the scrambled user data in the recording frame direction P.

In the path S1, the EDC generator 13 generates EDC and the EDC buffer 14 stores the EDC. Then, the scrambler 16 performs scrambling and the scramble buffer 17 stores a scramble intermediate value. Finally, the ECC generator 18 generates ECC and the ECC buffer 19 stores the ECC. Though the process sequentially executes these processing, since the output data in each circuit is sequentially input to a subsequent processor, the processing in the path S1 in each circuit is parallel processing. Further, in the path S2, EDC-added data that is created by adding EDC to user data from the data buffer 11 through the buffer controller 12 and the integration section 20 is written to the substitution buffer 21 and then read out in the recording frame direction P. The scrambler 22 then performs scrambling thereon in each recording frame data. The scrambled data is supplied to the integration section 101 in the sequence of the recording frame direction P. The integration section 101 performs pre-modulation processing including ECC addition and interleaving. Though the above processing is executed sequentially in the path S2 also, parallel processing is performed in each circuit just like the path S1.

Therefore, during the processing in the path S2 on the (t-1)th RUB to be recorded on the disc 104, the processing in the path S1 on the t-th RUB is performed. Thus, before the start of the processing in the path S2 on the (t-1)th RUB, the processing in the path S1 on the (t-1)th RUB is completed. In other words, the path S1 at least conducts the processing on the data at least 1 RUB prior to the data processed by the path S2.

The operation of the recording apparatus 3 is described hereinafter in further detail. In FIG. 1, codes such as (S0), (S1-1) and (S2-1) indicate data processing order between blocks. Specifically, (S0) indicates the processing prior to the path S1, (S1-) and (S2-) indicate the processing in the path S1 and the path S2, respectively. S1-1, S1-2 and so on indicate the processing order in the path S1 to describe the operation of the recording apparatus 3. This is the same for S2-1, S2-2 and so on.

Firstly, the host 2 directs the recording apparatus 3 to record user data on the disc 104 and transfers the user data corresponding to the (t-1)th and t-th RUB (S0). At this time, the recording apparatus 3 executes the processing of the path S1 and the path S2 in parallel at the same time. The data buffer 11 has a memory area that is capable of processing user data contained in 2 RUB. For example, it has two or more memory areas, each capable of storing user data contained in 1 RUB. If they are memory areas 11*a* and 11*b* (not shown), for example, one memory area 11*a* stores the user data corresponding to the t-th RUB. The data buffer 11 supplies the user data from the memory area 11*a* to the EDC generator 13 at high speed by burst transfer. The other memory area 11*b* stores the user data corresponding to the (t-1)th RUB. The processing of the path S2, which is described later, is performed by using the user data corresponding to the (t-1)th RUB.

(3-1) Operation of Path S1

The path S1 is described first. The user data transferred from the host 2 in the user data direction Q is temporarily stored in one memory area 11*a*, for example, of the data buffer 11 in the sequence of the user data direction Q. The data buffer 11 is configured by SDRAM or the like as described earlier, and it is a temporary memory capable of burst transfer of successive data in storing sequence, which is in the user data direction Q. The address to start the burst transfer, which is a head address, may be specified at random.

Figure 8:
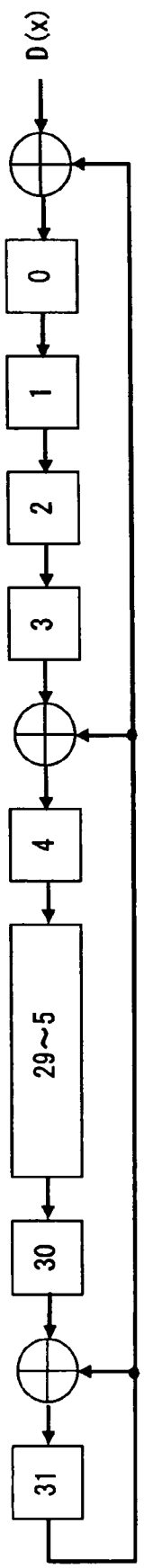
FIG. 8 is a view showing an example of a shift register for EDC operation.

The buffer controller 12 acquires the user data arranged along the user data direction Q from the data buffer 11 by the burst transfer or the like and supplies the acquired data to the EDC generator 13 (S1-1) and also to the integration section 15 (S1-2). The EDC generator 13 has a operation portion (not shown) for performing a prescribed operation. EDC in Bluray standards may be obtained by performing a prescribed operation on data in the user data direction Q. As an operation part, a 32-bit shift register as shown in FIG. 8, for example, may be used as an EDC operation shift register. Though the processing of the path S1 is executed in units of user data (data block) contained in one RUB, the circuits such as the EDC generator 13, the scrambler 16 and the ECC buffer 19 execute the operation in parallel.

The operation shift register generates 4 bytes of EDC upon input of 2052 bytes composed of 2048 bytes of user data in one sector added with 4 bytes of 0 data in the user data direction Q. The EDC is thus generated for each sector.

In order to execute the processing to add EDC to user data in the path S2 also without using an EDC operation portion, the EDC generator 13 of this embodiment acquires 4 bytes of EDC from the data frame D2 that is operated by the EDC operation portion and stores it into the EDC buffer 14 (S1-3). If EDC is calculated in advance in this way, it is not necessary in the path S2 to process data for each sector when adding EDC.

The EDC generator 13 sequentially operates 32 sectors of EDC contained in 1 RUB for each sector and sequentially stores them into the EDC buffer 14. Thus, the EDC buffer 14 has an area to store the 32 sectors of EDC. During the execution of the path S1, the subsequent path S2 is executed in parallel at the same time, and the 32 sectors of EDC contained in the (t-1)th RUB is used therefore. Thus, it further has an area to store the 32 sectors of EDC contained in the (t-1)th RUB. Accordingly, the EDC buffer 14 is configured by a temporary memory capable of random access, such as SRAM or SDRAM, which has a memory capacity of a total 256 bytes or greater, that is 4 bytes times 32 (sectors) times 2 paths. The EDC buffer 14 supplies the EDC to the integration section 15 (S1-4).

The integration section 15 integrates the user data D1 arranged in the user data direction Q that is transferred from the data buffer 11 and the EDC that is generated as described above to create EDC-added data and supplies it to the scrambler 16 (S1-5).

Figure 22:
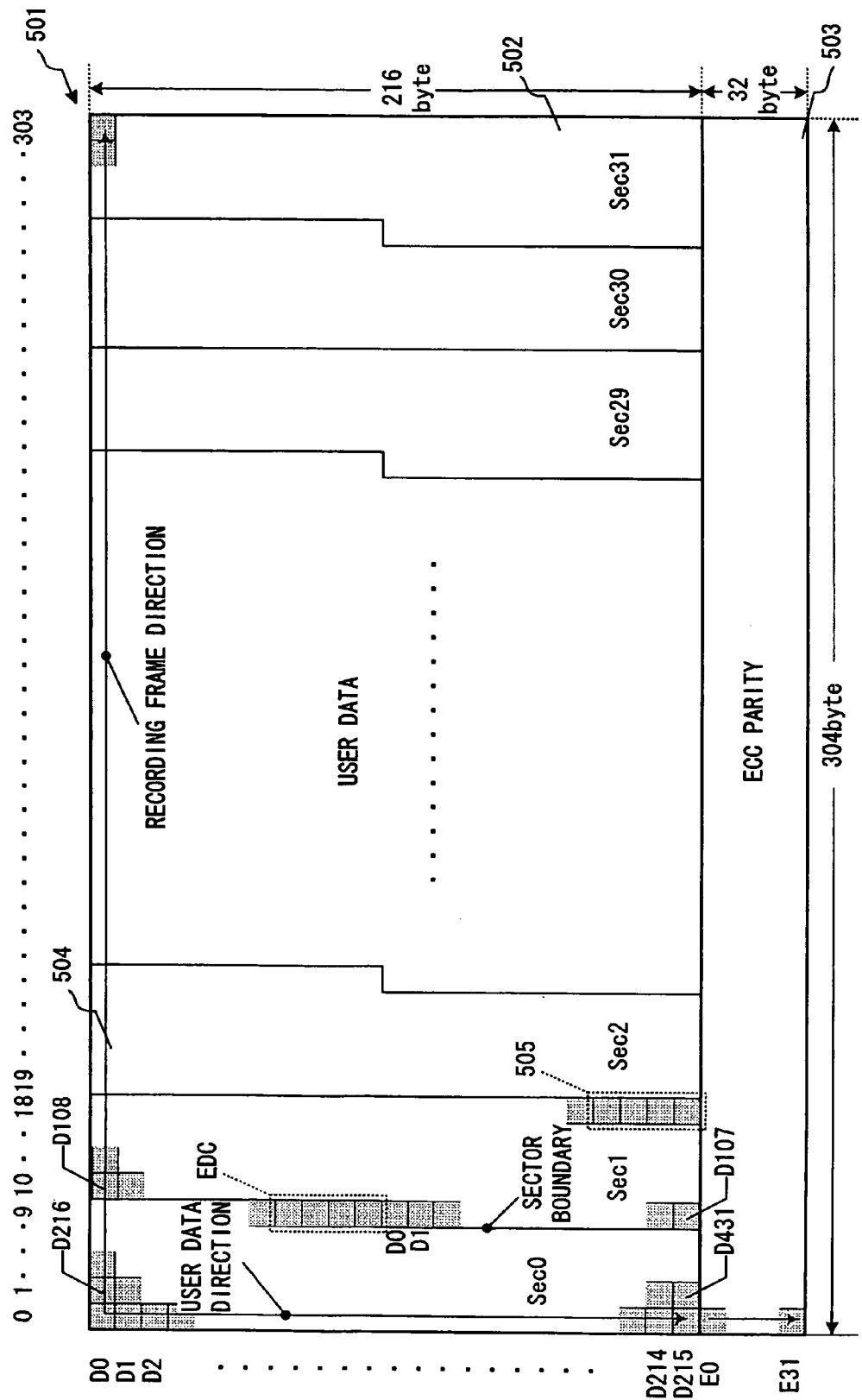
FIG. 22 is a diagram showing an LDC block.

The scrambler 16 includes a scramble shift register that shifts by 8 bits the scramble initial value that is initialized with an address value of a head sector of a cluster in each sector and outputs the low-order 8 bits as a scramble value, and a logic circuit that calculates exclusive OR of the scramble value and the EDC-added data input sequentially in the user data direction Q. The scramble shift register performs 8-bit shift at the timing of inputting the data frame D2 one byte by one byte into the scrambler 16 and outputs a scramble value. The scramble shift register may be a shift register shown in FIG. 22 which sequentially shifts the initial value and performs a prescribed operation.

The scrambler 16 having this configuration receives EDC-added data one byte by one byte sequentially in the user data direction Q through the integration section 15. At the input timing of input data Dk, the scramble shift register outputs scrambling data Sk, and the scrambler 16 outputs scrambled data Dk' that is exclusive OR of them. The scrambling is thus performed in the user data direction Q to create scrambled data. At this time, the scrambler 16 stores a storage value (16 bits) of the scramble shift register as a scramble intermediate value. The scramble intermediate value of 16 bits is used to calculate the scramble value in the recording frame direction P, not the user data direction Q, in the path S2.

However, storing scramble intermediate values corresponding to all EDC-added user data results in a large data memory amount to be stored. As described above, each sector have the same scramble intermediate values in one area where an even number sector and an odd number sector are in pairs. Further, when EDC-added data is viewed in the user data direction in one area, the scramble value for the data in each recording frame direction (row direction) P can be obtained by shifting the scramble shift register by 8 bits (one time).

Specifically, in Blu-ray standards, the same value of scramble value is set for the data byte 0 to byte 2051 in one cluster regardless of sector contained in a sector as shown in FIGS. 2 and 3. Therefore, a scramble value of 20th byte (20th column) in the recording frame direction P in the recording frame is the same as a scramble value of 0th byte (1st column). Thus, if the user data and the EDC constituting a sector are arranged sequentially from 0 to 2051, each data sequence completes in every two sectors (areas) composed of 19 lines. Further, when viewed in the user data direction Q, each data sequence is in succession and a scramble value is a value shifted by 1 byte or 8 bits. Thus, it is possible to calculate all scramble values easily from scramble intermediate values (16-bit shift register value times 19 columns) of one row in 19 columns.

When there is a regularity as described above, the scrambler 22, which is described later, can execute scrambling even if data is converted into data sequence that is different from an original operation processing sequence. In this embodiment, the amount of data that is stored as scramble intermediate values is only 19 words (16 bits times 19), which is just one row in one area. The embodiment calculates a scramble value in the recording frame direction P based on the stored values and performs scrambling in the recording frame direction P by the scrambler 22. Therefore, the scramble intermediate values to be stored is as small as the data amount of $\frac{1}{16}$ of the scramble intermediate values that is required for scrambling one row of data block, which is 304.

Since the scramble intermediate value is obtained in the process of scrambling by the scrambler 16, this embodiment describes that scramble intermediate values are obtained from the scrambler 16. It is, however, feasible to store scramble intermediate values that are calculated in advance.

This embodiment uses a 16-bit shift register value (16 bits) that is used when scrambling the first two sectors (Sec 0 and Sec 1) of EDC-added user data contained in 1 RUB that is processed in the path S1 as the scramble intermediate value to be stored in the scramble buffer 17. The scramble intermediate value is sequentially sent to the scramble buffer 17 and stored therein during the scrambling by the scrambler 16 (S1-6).

Further, in order to execute the path S2, which is described later, for scrambling 32 sectors of data contained in the (t-1)th RUB in parallel with the path S1, a memory area for storing scramble intermediate values for 32 sectors contained in the (t-1)th RUB is required. Thus, the scramble buffer 17 is configured by a temporary memory capable of random access, such as SRAM, which has a memory capacity of 76 bytes or larger, which is 38 bytes (16 bits times 19) times 2 paths. The detail of the scrambling is described later.

On the other hand, the scrambled data that is obtained by scrambling data in the user data direction Q is supplied to the ECC generator 18 in the same processing sequence, which is in the user data direction Q (S1-7). Receiving the one-column data of 216 bytes, the ECC generator 18 performs a prescribed operation thereon to create ECC parity of 32 bytes and supplies the ECC parity sequentially to the ECC buffer 19. The ECC buffer 19 also requires an area for operating and writing ECC parity (see FIG. 3) to be added to the user data contained in the t-th RUB in the path S1 and an area for transferring ECC parity to be added to the user data contained in the (t-1)th RUB to a readout integration section 101 in the path S2. The ECC buffer 19 is thus configured by a temporary memory capable of random access, such as SRAM or SDRAM, which has a memory capacity of 9728 bytes (32*304 bytes) times 2 paths or larger. It is also feasible to generate ECC parity in the ECC generator 18 and sequentially supplies it to the integration section 101. In this case, the integration section 101 may have a buffer for ECC parity.

(3-2) Operation of Path S2

The path S2 is described below. The processing of the path S2 executes operation on user data corresponding to the (t-1)th RUB by using the values of the EDC buffer 14, the scramble buffer 17 and the ECC buffer 19 that have been obtained by a process similar to the above process while the path S1 executes the operation on the t-th RUB. It performs operation in the recording frame direction P on the user data that is burst transferred from the data buffer 11 with a burst transfer data size m in the user data direction Q.

Firstly, the buffer controller 12 reads out user data by burst transfer from the data buffer 11. The integration section 20 reads EDC from the EDC buffer 14 at a predetermined timing, adds the EDC to the user data that is read out by repeating burst transfer and then supplies the EDC-added user data to the substitution buffer 21.

The buffer controller 12 repeatedly reads out the user data of one burst transfer size with m-bytes from the data buffer 11 in the user data direction Q and sequentially transfers the data so that EDC-added data is arranged in the sequence of the recording frame direction P. Specifically, it transfers 216 bytes of data in the user data direction Q in units of burst transfer size of m-bytes repeatedly for the number of bytes (304 bytes) in the recording frame direction P, which is 304 times. The data of the user data in the recording frame direction P that is contained in 1 RUB (data block) is thereby rearranged m number of rows in the user data direction Q.

The substitution buffer 21 is configured by a temporary memory capable of high speed random access such as SRAM or register. The burst transfer of data from the data buffer 11 is repeated until the data of a recording frame completes in the recording frame direction P. During the writing, it is necessary to read the user data stored in the substitution buffer 21 in the sequence of the recording frame direction P at high speed. Thus, the substitution buffer 21 has an area for storing data of at least burst transfer size m times recording frame (304 bytes) times 2 (for writing and reading) for data writing and data reading.

The scrambler 22 has a scramble shift register that is similar to the scrambler 16. The scramble shift register updates scramble intermediate values stored in the scramble buffer 17 as needed to create a scramble value corresponding to EDC-added data that is input in the recording frame direction P. Then, the scrambler 22 calculates an exclusive OR of the obtained scramble value and the input EDC-added data and outputs scrambled data.

If the scramble buffer 17 stores scramble intermediate values in the first row of the area 0, a scramble value in the recording frame direction P is obtained merely by supplying the values sequentially to the scrambler 22. If the scramble intermediate values are input to the scramble shift register and shifted by 8 bits, scramble intermediate values corresponding to the next row may be obtained. The scramble intermediate values stored in the scramble buffer 17 are thus updated in each processing of one recording frame, thereby outputting scramble intermediate values for all data. The generated scrambled data is supplied sequentially in the recording frame direction P to the integration section 101.

The integration section 101 adds ECC acquired from the ECC buffer 19 to the scrambled data sequentially input in the recording frame direction P, inserts BIS therebetween to create ECC cluster and physical cluster and transfers them to the 17PP modulator 102.

This embodiment uses EDC and scramble intermediate values that are calculated based on the user data sequentially input in the user data direction Q in the path S1 so as to add EDC to the user data to create scrambled data in the path S2, thereby outputting the scrambled data in the sequence of the recording frame direction P. Use of the EDC and the scramble intermediate values that are calculated in advance in the path S2 allows output of the scrambled data arranged in the recording frame direction P only with the substitution buffer 21 of a memory capacity as small as m*304bytes*2.

(4-1) Operation of Substitution Buffer

The operation of the path S2 is described hereinafter in detail. The user data that is transferred to the substitution buffer 21 is detailed first. In Blu-ray disc, the data in the user data direction Q has 216 bytes in one column. The following description describes the case of performing the burst transfer every 24 bytes, which is a result of dividing the data into 9 parts (burst transfer size m=24 bytes). In the following description, a burst transfer size from the data buffer 11 is m=24 in this embodiment, the burst transfer size is not limited to 24 bytes.

SDRAM is DRAM that is capable of burst transfer at high speed in synchronization with clock. For example, the burst transfer of 32 bytes is made possible if a memory cell of SDRAM is composed of four blocks (banks) that can operate separately from each other and with use of 8 times of successive burst transfer. SDRAM is capable of high-speed data transfer by burst transfer of prescribed data if a first address for burst transfer is specified.

Figure 9:
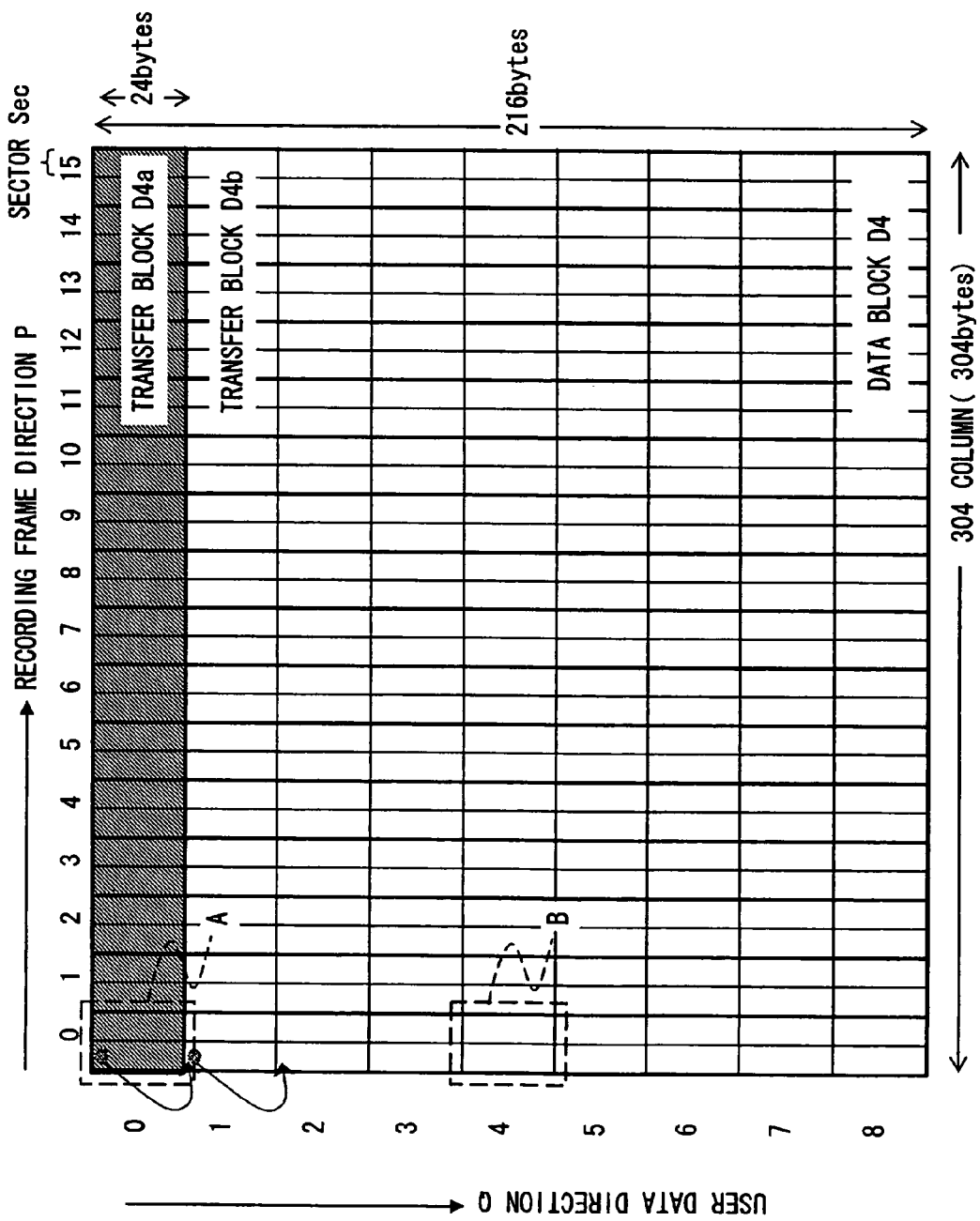
FIG. 9 is a view to describe data transferred from a data buffer to a substitution buffer.
Figure 10A:
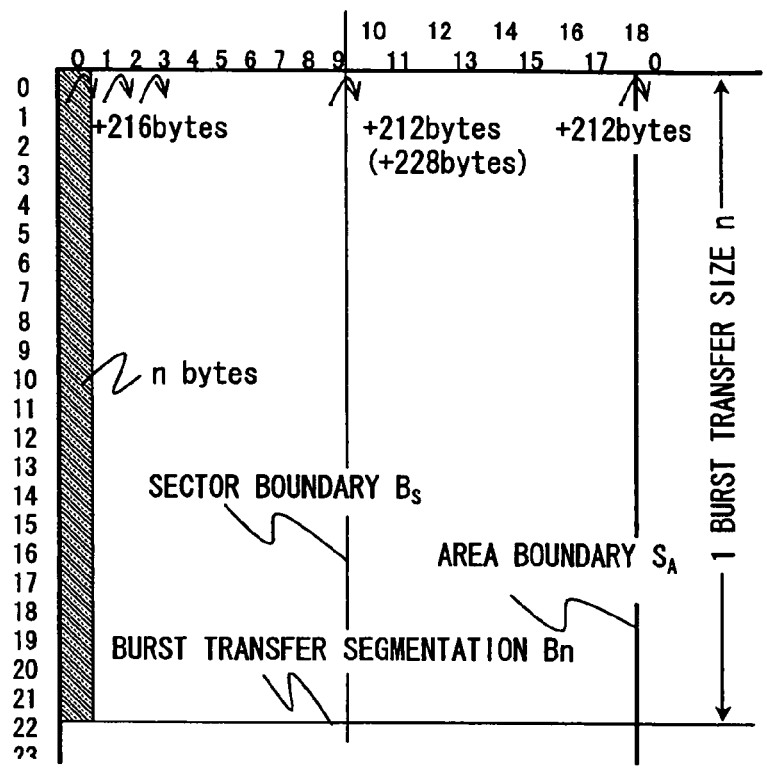
FIG. 10A is an enlarged view of an area A shown in FIG. 9.
Figure 10B:
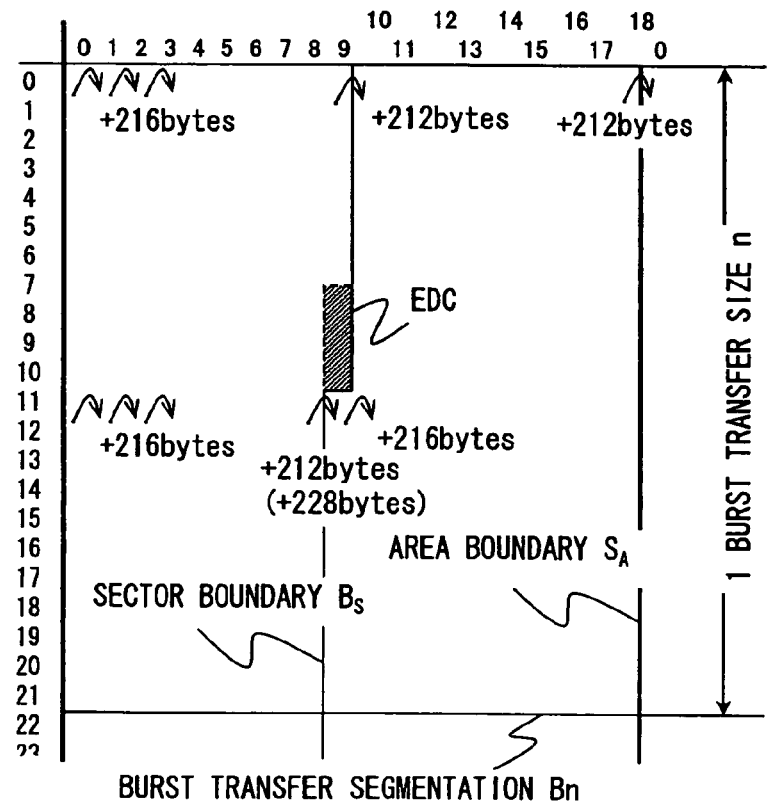
FIG. 10B is an enlarged views of an area B shown in FIG. 9.
Figure 11:
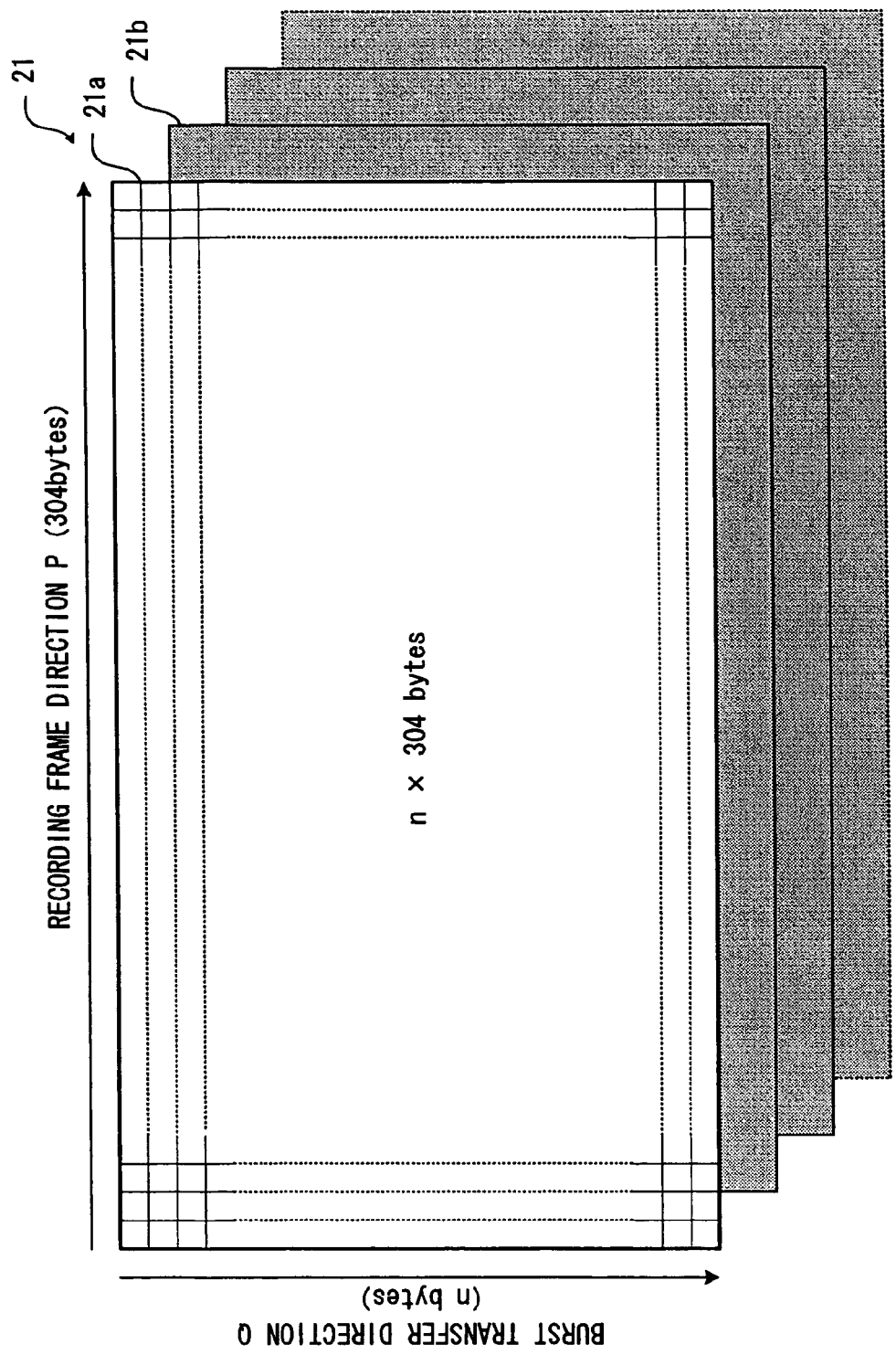
FIG. 11 is a diagram showing a substitution buffer according to the first embodiment of the invention.

FIG. 9 is a view to describe the data transferred from the SDRAM 11 to the substitution buffer 21. FIGS. 10A and 10B are enlarged views of the areas A and B, respectively, shown in FIG. 9. FIG. 11 is a diagram showing the substitution buffer 21. As shown in FIG. 10, the buffer controller 12 repeats the processing to transfer m-bytes data to the substitution buffer 21 in one-time burst transfer from the data buffer 11 for 304 bytes sequentially in the recording frame direction P, which is 304 times. The data indicated by shadow in the data block D4 in FIG. 9 is thereby transferred. The data groups composed of m frames are referred to herein as transfer blocks D4$a$, D4$b$, D4$c$ to D4$i$. The substitution buffer 21 is configured by a memory capable of high-speed random access such as SRAM or register. The substitution buffer 21 has two or more planes of memory areas capable of storing the transfer block D4$a$ as shown in FIG. 11 so as to read the EDC-added data after burst transfer from one memory area and send it to the scrambler 22 while writing EDC-added data into the other memory area by burst transfer. The m-byte data that have been transferred by one-time burst transfer is stored in the substitution buffer 21 in the order of addresses (vertical direction). Further, the m-byte data are stored in the substitution buffer 21 in the horizontal direction with respect to each time when the burst transfer is performed. As a result, the EDC-added data having m bytes (the burst transfer size) in the vertical direction and 304 bytes (the number of burst transfer times, i.e. 304) in the horizontal direction are stored in the substitution buffer 21. Since the substitution buffer 21 is capable of random access, it is possible to read the data of 304 bytes in each frame at high speed sequentially in the recording frame direction P as shown in FIG. 9.

Referring to the areas A and B shown enlarged in FIGS. 10A and 10B, respectively, the data in the recording frame direction P is the data of every 216 bytes when viewed in the user data direction Q. Since, in Blu-ray standards, one sector contains 2048 bytes of user data and 4 bytes of EDC and the data transferred from the data buffer 11 is user data only, one sector has 2048 bytes. Thus, the first column byte, which is referred to herein as the odd number head column, in an odd number sector adjacent to an even number sector is the data of every 212 bytes, not every 216 bytes. The odd number head column is 9th or 10th column in the sequence of the recording frame P in the sector Sec 1, and byte 0 to byte 107 in the sequence of the user data direction Q are in the 10th column and byte 108 to byte 215 are in the 9th column. Thus, when reading the data corresponding to the odd number head column in the recording frame direction P, the data is not every 216 bytes but every 212 bytes.

Though this embodiment describes that the user data is not added with EDC, it is feasible to add 4-byte data, for example, to the user data in advance instead of EDC when transferring the user data from the host 2, when storing the user data into the data buffer 11 or the like. In this case, the integration section 20 may replace original EDC that is read out from the EDC buffer 15 with this data and transfer it to the substitution buffer 21. The address in the data buffer 11 may have 2052 bytes as one unit, which is the same as a sector unit in the substitution buffer 21 after EDC addition, thus only requiring address calculation of adding 4 to 2048 of user data. Further, if one sector has (2048+N) bytes including N byte of sector size adjustment byte, it may be used in the same manner for other formats with a different sector data unit.

For example, in Blu-ray disc, one recording unit of RUB is composed of 32 sectors. Each sector has a total 2052 bytes including 2048 byte data added with 4 byte EDC code. If the data amount N to be added to the 2048 byte user data, which is referred to herein also as the sector size adjustment byte where N is byte, is adjustable, it may be used also as buffer control for a disc having another format. For example, if N=16 bytes, it is applicable to DVD or the like where one sector of data size including EDC or the like is 2064 bytes. The sector size adjustment byte N and address calculation when using it are detailed later.

As shown in the reference example of FIG. 5, when executing high-speed data transfer in the recording frame direction P, a normal configuration requires a memory area for storing the data corresponding to 1 RUB, which is referred to herein also as the data block, having 216*304 bytes. On the other hand, in this embodiment, if 24 bytes that are one-ninth of 216 bytes constitute one burst unit, for example, it is possible to use SRAM of an extremely small capacity of 24*304 bytes (m*304 bytes) as shown in FIG. 9.

The substitution buffer 21 has two or more memory areas 21 having burst transfer size m times one recording frame (304 bytes) as shown in FIG. 11. Thus, the recording area 21a of the substitution buffer 21 is smaller than a memory capacity required for processing 1 RUB. The substitution buffer 21 has another memory area, for example a memory area 21b of the same size as the memory area 21a, in order to read and scramble the user data written from an other memory area during data writing to one memory area 21a so as to execute processing of user data corresponding to 1 RUB in the path S2. It may be more than two planes of the memory areas 21a and 21b. The arrangement of data in the substitution buffer 21 is such that the user data direction Q and the burst transfer direction Q' that are in the same direction are perpendicular to the recording frame direction P.

If the substitution buffer 21 has two planes of memory areas (memory areas 21a and 21b) and uses one memory area 21a for writing and the other memory area 21b for reading, it switches the memory areas 21a and 21b upon completion of transferring EDC-added data of one transfer block into the memory area 21a for writing and completion of outputting from the other memory area 21b to the scrambler 22. After switching, it executes the processing of writing EDC-added data of one transfer block into the memory area 21b that is now a memory area for reading and reading EDC-added data from the memory area 21a that is now a memory area for reading out to the scrambler 22. In this way, the substitution buffer 21 switches memory areas for writing and reading each time writing and reading of one transfer block completes. When writing EDC-added data (transfer block) into a memory area for writing, the user buffer 11 burst transfers user data.

(4-2) Head Address Control Method

Since a head address of the data buffer 11 in the burst transfer is every 216 bytes or 212 bytes, the buffer controller 12 needs to calculate and specify the first address in the data buffer 11 upon the first burst transfer. A method of calculating a head address when the buffer controller 12 executes burst transfer from the data buffer 11 is detailed below. The first address (which is referred to herein as the head address) of burst transfer that is specified in the data buffer 11 may be calculated by the buffer controller 12 with operation based on the previous head address or the like. Alternatively, the head address may be calculated with operation based on the information of the substitution buffer 21 to control the buffer controller 12, and a front address operation circuit may be placed outside of the buffer controller 12 or the substitution buffer 21. In the followings, the case of calculating a head address based on the information of the substitution buffer 21 and controlling the buffer controller 12 is described.

In the substitution buffer 21, upon completion of transferring the transfer block D4a shown in FIG. 9, for example, to one memory area 21a, burst transfer of the transfer block D4b to the other memory area 21b is started. During the burst transfer of the transfer block D4b, the scrambler 22 performs scrambling on the transfer block D4a. As described earlier, this embodiment writes user data into the data buffer 11 in sectors of 2048 bytes and writes data into the substitution buffer 21 in sectors of 2052 bytes where 4 bytes of EDC is added to the user data. Thus, the next burst transfer head address at the sector boundary is not simply +216 bytes. Thus, this embodiment specifies the head address of user data in the data buffer 11 so as to transfer the transfer block D4b, for example, to the memory area of the substitution buffer 21. The encoding device 10 therefore has a head address calculator for supplying a head address to the buffer controller 12.

Figures 12A, 12B:
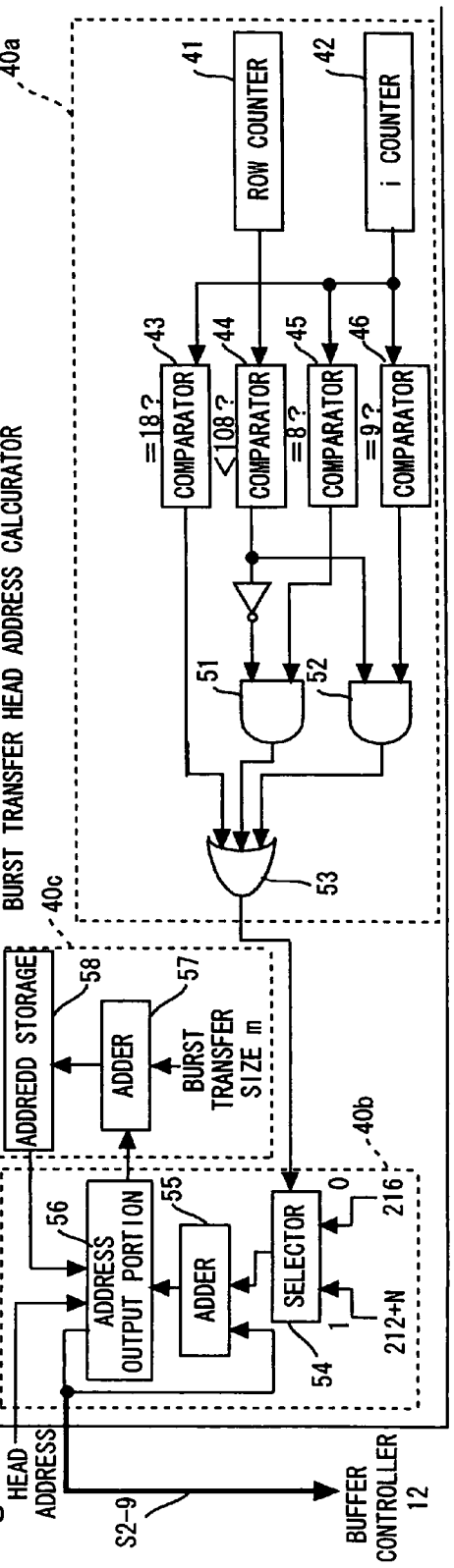
FIG. 12A is a diagram showing an address of user data stored in a substitution buffer according to the first embodiment of the invention.
FIG. 12B is a block diagram showing a burst transfer head address calculator circuit according to the first embodiment of the invention.

FIG. 12A is a diagram showing addresses of user data stored in the substitution buffer 21. FIG. 12B is a block diagram showing a burst transfer head address calculator 40 for operating a head address. Though the head address calculator 40 is placed in the substitution buffer 21 in this embodiment described below, it may be placed outside of the substitution buffer 21. In the following description, a sequence (address) in the user data direction in one sector (0th to 2051th data) in the substitution buffer 21 is represented a [****].

As shown in FIG. 12B, the head address calculator 40 has two counters of a row counter 41 and an i counter 42. The row counter 41 counts a row number R (see FIG. 2) in the user data direction Q in the data block. Since one sector has data sequences that are folded every 216 bytes, the data block has 216 rows. The row counter 41 therefore counts from 0 to 215. The data of m number of rows in one column is transferred in each burst transfer, and it is repeated 304 times until transfer of data in one transfer block completes. Thus, if m=24, the row counter 41 repeats the operation that counts from 0 to 23 for 304 times and then counts from 24 to 47 from the 305th time when the transfer of data in the second transfer block starts.

The i counter 42 counts the data in the recording frame direction P in one area. One area is composed of two sectors and the two sectors has 19 byte columns as described above. Thus, the i counter 42 counts from 0 to 18. Since one transfer block is composed of 16 areas, the i counter 42 repeats counting from 0 to 18 for 16 times until data transfer of one transfer block completes. Further, since the data of m number of rows in one column is transferred in each burst transfer, the counter may be incremented every m bytes. The configuration thus allows determining to which row and column input data corresponds with the row counter 41 and the i counter 42.

Further, the head address calculator 40 has comparators 43 to 46. The comparator 43 determines whether an i count value is 18. The comparator 44 determines whether a row count value is smaller than 108 (R0 to R107). The comparator 45 determines whether an i count value is 8. The comparator 46 determines whether an i count value is 9.

The head address calculator 40 has logic circuits 51 to 53. The logic circuit 51 is an AND circuit for calculating a logical AND of an inverted output of the comparator 44 and the comparator 45. The logic circuit 52 is an AND circuit for calculating a logical AND of the comparator 44 and the comparator 46. The logic circuit 53 is an OR circuit for calculating a logical OR of the outputs of the comparator 43 and the logic circuits 51 and 52. Specifically, the logic circuit 53 outputs "1", for example, only when the i count value is 18, when the row count value is smaller than 108 and the i count value is 9, or when the row count value is 108 or larger and the i count value is 8. The counters 41 and 42, the comparators 43 to 46 and the logic circuits 51 to 53 constitute a sector boundary detector 40a, thereby detecting a sector boundary of input data.

The head address calculator 40 includes a selector 54, adders 55 and 57, an address output portion 56 and an address storage 58. The selector 54 outputs 212+N when the output of the logic circuit 53 is "1" and outputs 216 when the output of the logic circuit 53 is "0". The adder 55 adds the output of the address output portion 56 and the output of the selector 54. The address output portion 56 outputs the output of the adder 55 as a head address. The adder 57 adds a burst transfer size m to the address from the address output portion 56. The address storage 58 stores an addition result from the adder 57. The output from the address output portion 56 is sent as a head address to the buffer controller 12 and also to the adder 55. The head address is supplied also to the adder 57 only at the first burst transfer in the transfer block.

The selector 54, the adder 55 and the address output portion 56 constitute an address updater 40b. The adder 57 and the address storage 58 constitute a next transfer block head address storage 40c. Each time the burst transfer is performed, the buffer controller 12 receives the head address output from the address updater 40b and specifies the head address in the data buffer 11. The next transfer block head address storage 40c stores the value that adds a burst transfer size m to the head address in the first burst transfer in the transfer block whose data is presently transferred as a head address for the first burst transfer in the next transfer block.

Figure 13:
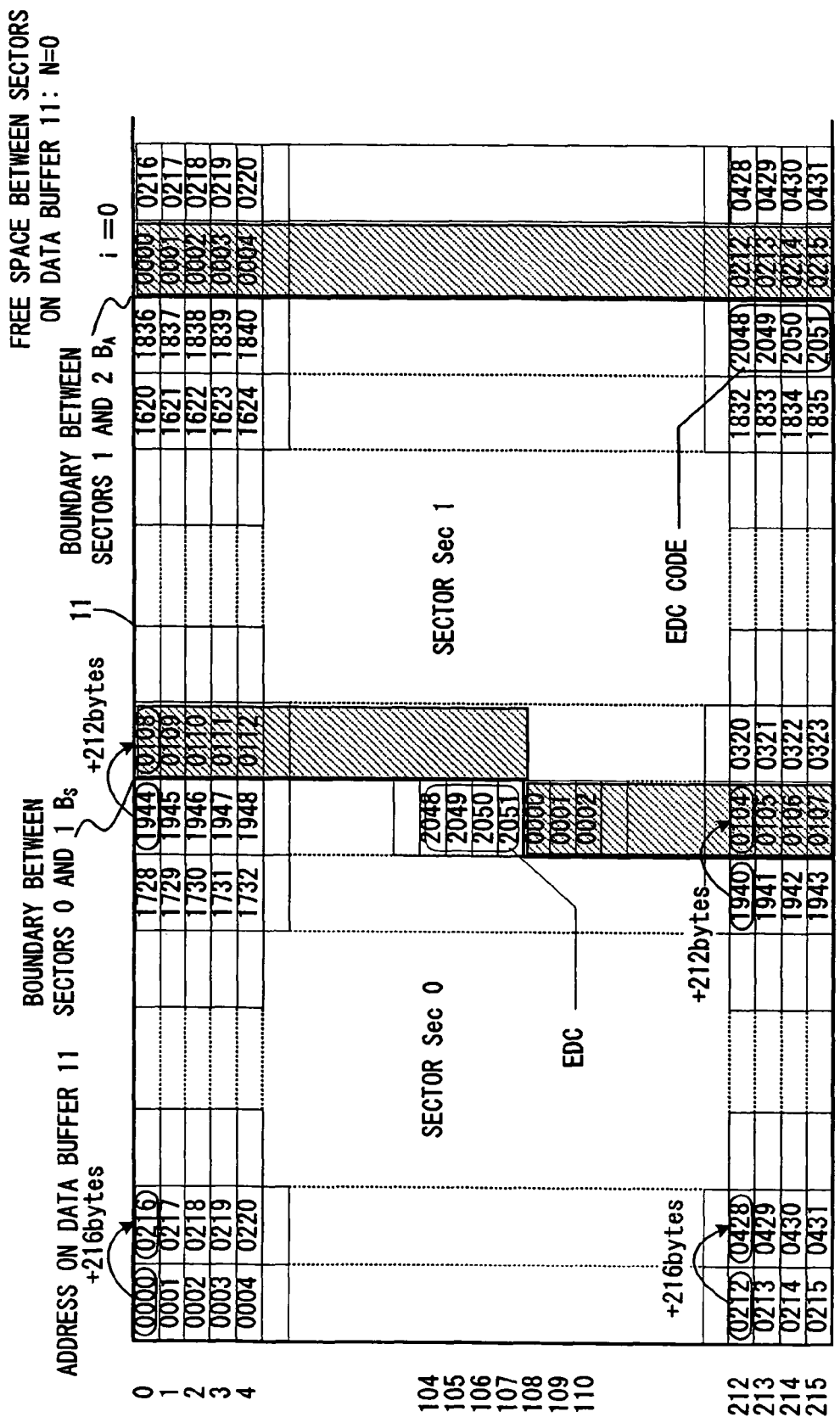
FIG. 13 is a view to describe a data buffer and an address of a substitution buffer according to the first embodiment of the invention.

FIG. 13 is a view to describe the addresses of the data buffer 11 and the substitution buffer 21. As described earlier, since user data has 2048 bytes in one sector in Blu-ray standards, addresses [0000] to [2047] are assigned repeatedly to the user data of each sector stored in the data buffer 11. Thus, displacement of 4 bytes caused by the addition of EDC occurs in sector boundaries, and therefore the head address calculator 40 calculates a head address specified in the data buffer 11 by using address information in the substitution buffer 21 or the data buffer 11.

The present embodiment describes that the burst transfer head address calculator 40 calculates a head address by using a parameter in the substitution buffer 21, it may calculate a head address by using a parameter necessary for the transfer in the buffer controller 12. In this case, the head address calculator 40 may be placed inside or outside of the buffer controller 12.

Figure 14:
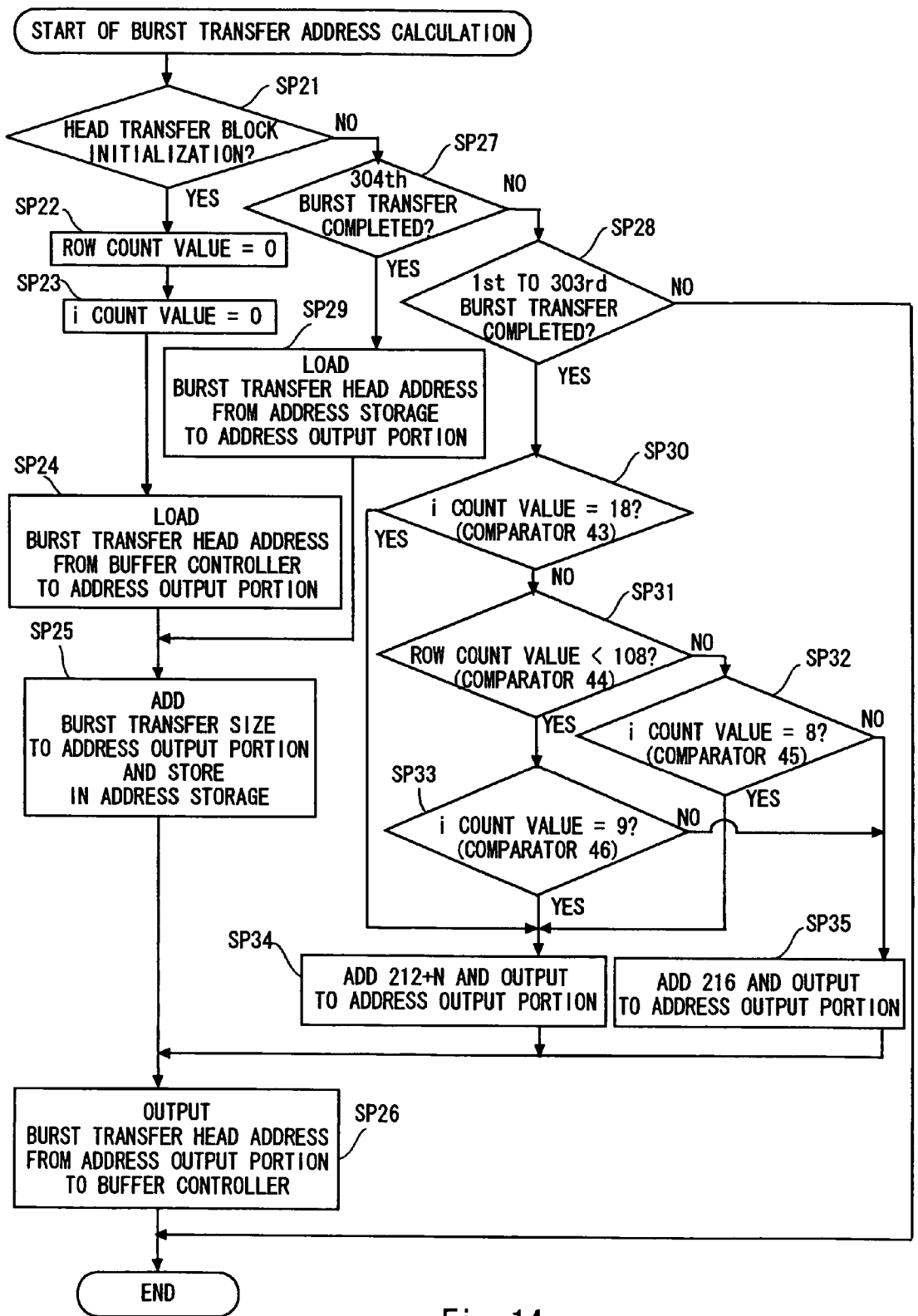
FIG. 14 is a flowchart showing a calculation method of an address calculator circuit according to the first embodiment of the invention.

The operation of the head address calculator 40 is described below. FIG. 14 is a flowchart showing a calculation method of the address calculator. In this embodiment, if a time period to input data into the substitution buffer 21 is T, the process from step SP21 is executed repeatedly in each time period T.

Firstly, Step SP21 determines whether it is transfer of data in the first transfer block of the data block. When transferring the data of the first transfer block (head transfer block D4a) in the data block, which is called the head transfer block initialization, Step SP22 sets the row count value of the row counter 41 to 0 and Step SP23 sets the i count value of the i counter 42 to 0. While one transfer block is transferred to one memory area of the substitution buffer, the scrambler 22 performs scrambling by using the transfer block that has been transferred to the other memory area. The recording apparatus 3 detects the timing by a controller including a counter or the like, which is not shown, and supplies it to the burst transfer head address calculator 40 and the scrambler 22. During the head transfer block initialization, Step SP24 loads a head address (=[0000]) for the first burst transfer in the head transfer block as an initial value from the buffer controller 12. The address output portion 56 supplies the initial value address [0000] to the adder 57. The adder 57 adds a burst transfer size m=24 to the address [0000] that is output from the address output portion 56 and supplies the address [0024] to the address storage 58 in Step SP25. The address value stored in the address storage 58 is a head address of the first column (i=0) in the next transfer block.

On the other hand, the address output portion 56 supplies the received head address (=[0000]) for burst transfer to the buffer controller 12. If it is not in the head transfer block initialization, Step SP21 results in N0 and SP27 determines whether 304th burst transfer has been completed. If the 304th burst transfer has not been completed yet, Step SP27 results in NO, and SP28 determines whether 1st to 303rd burst transfer has been completed. If it is the timing at the end of the 1st to 303rd burst transfer, Step SP28 results in YES and the process proceeds to Steps SP30 to SP35.

In this case, the row counter 41 and the i counter 42 in the sector boundary detector 40a determine whether the present timing satisfies the following conditions 1 to 3 with the comparators 43 to 46 and the logic circuits 51 and 52:

Condition 1: i count value=18
Condition 2: row count value<108 and i count value=9
Condition 3: row count value≧108 and i count value=8

In this embodiment, this determination is made when Step SP28 detects a timing at the end of the 1st to 303rd burst transfer. Specifically, the sector boundary detector 40a determines if the head address satisfies any of the above three conditions after the address output portion 56 supplies a head address to the buffer controller 12 so that m byte data is burst transferred from the data buffer 11 according to the head address.

These conditions are set for detecting a sector boundary and indicate the case of calculating a head address in the area that is shadowed in FIG. 13. In the sector boundary $B_S$ including the area boundary $B_A$, data is not every 216 bytes but every 212 bytes. Since the head address calculator 40 calculates a head address of a next column as an output address from the i counter and the row counter, the position of i is displaced by one column between input and output. Thus, though the sector boundary $B_S$ including the area boundary $B_A$ exists in i=0, 9 and 10, i=18, 8 and 9 are detected. The condition 1 is a condition for detecting the area boundary $B_A$ of the sector boundary and the conditions 2 and 3 are conditions for detecting the sector boundary (boundary between an even number sector and an odd number sector) $B_S$ in the area. The circuit configuration is not limited thereto but may be varied as long as it is capable of detecting a position (sector boundary) where the addresses of the data buffer 11 and the substitution buffer 21 are displaced and correcting it. The determination result in the logic circuit 53 is thereby supplied to the selector 54.

Specifically, when the i count value counted by the i counter 42 is not 18 (NO in Step SP30), when the row count value counted by the row counter 41 is not smaller than 108 (NO in Step SP31) and the i count value is not 8 (NO in Step SP32) and when the i count value is not 18 (NO in Step SP30) and the row count value is smaller than 108 and the i count value is not 9 (NO in Step SP33), it is determined that none of the above conditions is satisfied and the logic circuit 53 outputs "0".

On the other hand, when the i count value is 18 (YES in Step SP30), when the i count value is not 18 (NO in Step SP30), the row count value is 108 or larger (NO in Step SP31) and the i count value is 8 (YES in Step SP32) and when the i count value is not 18 (NO in Step SP30) and the row count value is smaller than 108 (YES in Step SP31) and the i count value is 9 (YES in Step SP33), the logic circuit 53 outputs "1".

In this way, the logic circuit 53 outputs "1" when any of the above conditions 1 to 3 is satisfied and outputs "0" when not satisfied and supplies the output to the selector 54. Thus, the logic circuit 53 determines if input address information indicates an address in a sector boundary by the above conditions 1 to 3.

If the selector 54 receives "1", which is when any of the above conditions 1 to 3 is satisfied, it outputs +212+N for address update. N is a variable value for adjusting a sector size where one sector is (2048+)N byte. In Blu-ray disc, the user data contained in one sector is 2048 bytes, and this embodiment stores data into the data buffer 11 every 2048 bytes, thus N=0. If, on the other hand, the selector 54 receives "0", which is when none of the conditions is satisfied, it outputs +216.

The adder 55 receives the output from the selector 54, which is a selection value of (212+N) or 216, adds it to the value stored in the address output portion 56 that is a previous output value from the address output portion 56, and supplies it to the address output portion 56 in Steps SP 34 and 35. The address output portion 56 outputs the received value to the buffer controller 12 in SP26. On the other hand, if Step SP28 determines that it is not at the completion of the 1st to 303rd burst transfer, which is when the present timing is under burst transfer, the process ends. If the Step SP27 determines that it is at the completion of the 304th burst transfer (YES in Step SP27), the address output portion 56 reads out the burst head address stored in the address storage 58 in Step SP29. The address output portion 56 supplies the burst head address read out from the address storage 58 to the adder 57 as described above. The adder 57 generates an added address by adding a burst transfer size m=24 to the burst head address and stores it into the address storage 58 in Step SP25. At the same time, the address output portion 56 supplies the burst transfer address readout from the address storage 58 to the buffer controller 12.

In this way, the address output portion 56 loads a head address from the buffer controller 12 in the first burst transfer of the head transfer block in one data block and supplies it to the buffer controller 12. In the first burst transfer of the transfer block different from the head transfer block, the address output portion 56 reads out a bust transfer address from the address storage 58 upon completion of the 304th burst transfer of the immediately previous transfer block and supplies it to the buffer controller 12. At the completion of the burst transfer in other than the above timings, the address output portion 56 repeats the processing of adding 212+N or 216 output from the selector 54 to an immediately previous burst head address and outputting it to the buffer controller 12 until one cluster (one data block) completes. After that, Step SP21 again determines it to be the initialization timing. Though this embodiment describes that the address output portion 56 outputs the address read out from the buffer controller 12, the address read out from the address storage 58 or the head address updated by the selector 54 and the added 55 at the end of one burst transfer, it is feasible to calculate an address during one burst transfer.

This is described in detail below. At the timing of head transfer block initialization when writing to the head transfer block is started, the address output portion 56 is supplied with an address [0000] as an initial value (initial burst transfer head address) from the buffer controller 12. The address output portion 56 supplies it to the buffer controller 12 as a burst head address of the first column (i=0) and also to the adder 57.

The sector boundary detector 40a determines whether the address output from the address output portion 56 at the end of the first burst transfer is at a sector boundary or not. Since the address [0000] is not at a sector boundary, the logic circuit 53 outputs "0" and the selector 54 thereby outputs 216. The adder 55 adds 216 to the initial value [0000] and supplies [0216] to the address output portion 56. The address calculator 40 repeats this process after that. The address output portion 56 calculates the head address of i=1 during or after burst transfer of i=0 and supplies it to the buffer controller 12.

Then, the address output portion 56 sequentially outputs the initial address [0000] and addresses [0216] to [1728] and then outputs [1944] to the buffer controller 12. The logic circuit 53 thereby outputs "1". By detecting the sector boundary Bs by the sector boundary detector 40a, it is possible to output a correct head address at the sector boundary Bs. The data buffer 11 has a pointer for indicating from which sector Sec of each sectors Sec having 2048 bytes the data to be read.

Further, during or after the final (304th) burst transfer of the head transfer block after outputting the head address for transferring the head transfer block to the final area of i=18, which is after the address output portion 56 outputs the head address [1836], the address output portion 56 reads out the head address of the next transfer block that is stored in the address storage 58. The substitution buffer 21 receives all the final burst transfer data sent from the data buffer 11 and then switches the memory areas upon completion of outputting all the data on the data output plane to the second sequence operation section.

While writing data to one recording area 21a, the transfer blocks after burst transfer are sequentially read out in the recording frame direction P from the other memory area 21b and supplied to the scrambler 22.

The data that is burst transferred from the data buffer 11 is user data that is transferred from the host 2 and not added with EDC. It is thus necessary to add EDC before inputting the user data to the substitution buffer 21.

In Blu-ray standard, EDC that is added after the final data in an even number sector is placed in the 104th to 107th row in the user data direction Q, which is at the middle of the data arranged in the user data direction Q (see FIG. 2). Thus, when reading data in the column direction in the recording frame direction P, the data transfer after the 104th row requires EDC. Since EDC is obtained after inputting all user data of each sector, it is impossible to read out the data in the recording frame direction P while calculating EDC as described earlier.

On the other hand, in the present invention, EDC for user data in the (t-1)th RUB is already calculated by the path S1 in the process of processing the user data contained in the (t-1)th RUB and stored in the EDC buffer 14. Thus, as shown in FIGS. 9 and 10B, if the burst transfer size is m=24, for example, it is necessary to add EDC in the burst transfer of the 4th transfer block and when transferring an even number sector and in the burst transfer of the 9th transfer block and when transferring an odd number sector. Thus, the integration section 20 reads out the EDC that has been calculated and stored by the path S1 from the EDC buffer 17 and adds it to the position where i=9 and the row number R=104 to 107 upon transferring the 4th transfer block and to the position where i=18 and R=212 to 215 upon transferring the 9th transfer block and stores the data into the substitution buffer 21. The timing of EDC addition may be executed by the integration section 20 or may be controlled by the buffer controller 12.

(4-3) Scramble Method

Then, the transfer block that has been burst transferred to the substitution buffer 21 is read out in the recording frame direction P and scrambled. The scrambling in the path S2 is described below.

Figure 15:
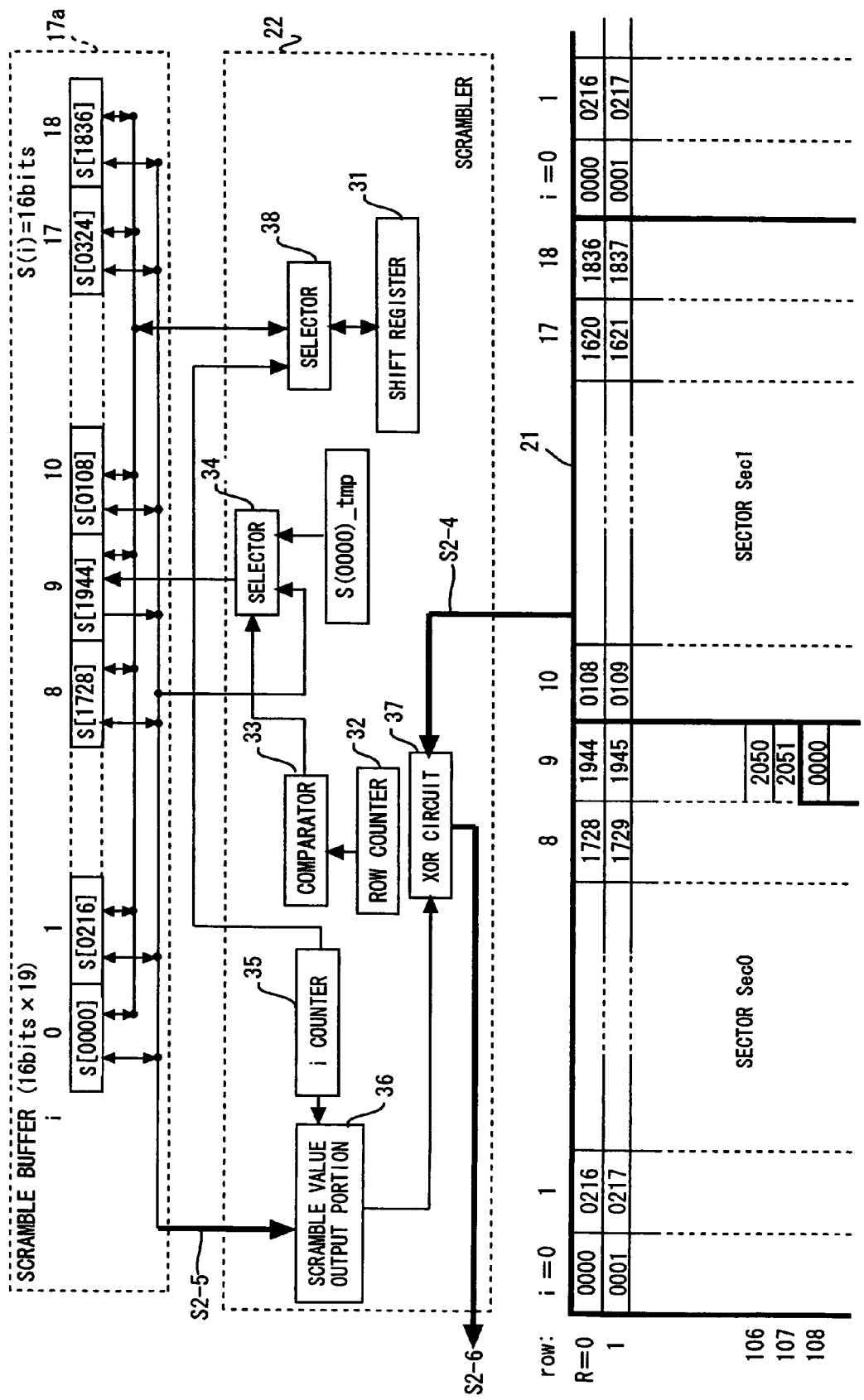
FIG. 15 is a block diagram showing the detail of a scrambler circuit 22 and peripheral circuits according to the first embodiment of the invention.

The scrambler 22 executes scrambling in the recording frame direction P by using a scramble intermediate value. The scrambling is executed for each recording frame. FIG. 15 is a block diagram showing the detail of the scrambler 22 and its peripheral circuits. A scramble intermediate value (16 bits times 19) that is necessary for scrambling the data contained in one recording unit RUB has been stored in advance in one memory area of the scramble buffer 17 by the path S1 as described earlier. The other memory area is used for evacuating or storing the scramble intermediate value under scramble processing in the path S1 as needed. The scramble intermediate value is supplied from one memory area, which is referred to herein as the scramble buffer 17a, to the scrambler 22. The scrambler 22 operates the value into a scramble intermediate value corresponding to each user data. The low-order 8 bits are then acquired as a scramble value and is exclusive ORed with the user data, thereby generating scrambled data.

Accordingly, the scrambler 22 is supplied with 19 scramble intermediate values S(i) that are stored in the scramble buffer 17a. The scramble intermediate values are values that the scramble buffer 17 stores the scramble intermediate initial value of 16 bits and the scramble intermediate value S(i) of every 108 bytes from the value generated and used by the scrambler 16 when performing scrambling in the path S1. In this embodiment, these values are obtained by storing the scramble intermediate values and the initial value with use of the operation result of the scrambler 16, they may be stored in advance.

The scramble buffer 17a includes 19 storages from scramble_value [0] to scramble_value [18] for storing 19 scramble intermediate values of 16 bits. The data is stored from the scrambler 16 to the scramble buffer 17a as follows: a scramble intermediate initial value in the scramble_value [0], a scramble intermediate value after 108 bytes in the scramble_value [10], a scramble intermediate value after 216 (=108*2) bytes in the scramble_value [1], a scramble intermediate value after 324 (=108*3) bytes in the scramble_value [11], and so on.

The scrambler 22 receives the scramble intermediate values and the EDC-added data in the recording frame direction P and performs scrambling thereon. The scrambler 22 thus has a shift register 31 that receives the scramble intermediate values, shifts them and operate the scramble intermediate value for the next EDC-added data in the user data direction Q. The shift register 31 is connected in common with the storages scramble_value [0] to scramble_value [18] of the scramble buffer 17 so as to sequentially update the scramble intermediate values stored in the storages scramble_value [0] to scramble_value [18] and write the updated values back to the storages scramble_value [0] to scramble_value [18].

The scrambler 22 further includes a row counter 32, a comparator 33, a selector 34, an i counter 35, a scramble value output portion 36 and a XOR circuit 37. The comparator 33 determines whether the row count value is 108 or not. The scramble value output portion 36 selects the value corresponding to the i count value that is stored in the storages scramble_value [0] to [18] at the timing of the i counter 35, acquires the low-order 8 bits of the value and outputs it as a scramble value. The XOR circuit 37 calculates an exclusive OR of the scramble value output from the scramble value output portion 36 and the EDC-added data readout from the substitution buffer 21. The scrambled data that is scrambled in the recording frame direction P by the XOR circuit 37 is output from the scrambler 22.

The scrambler 22 sets the initial values of the row counter 32 and the i counter 35 to 0 at the beginning of the input of EDC-added data corresponding to 1 RUB. The row counter 32 counts from 0 to 215 (R0 to R215) just like the row counter 41 described above, and the i counter 35 counts from 0 to 18 just like the i counter 42 described above.

The scramble buffer 17a outputs the stored values sequentially to the storages scramble_value [0] to scramble_value [18] at EDC-added data input timing from the substitution buffer 21. The storages scramble_value [0] to scramble_value [18] then sequentially output the scramble intermediate values that are stored presently by repeating 16 times until the input of the EDC-added data of one frame completes (by the completion of data input of one row).

The shift register 31 calculates the scramble intermediate value corresponding to the next EDC-added data in sequence of the user data direction Q from the scramble intermediate values output from the storages scramble_value [0] to scramble_value [18] and outputs it upon completion of the input of the EDC-added data of one recording frame. This value is referred to herein as the updated scramble intermediate value. The updated scramble intermediate value is stored in the storage scramble_value that has been output the scramble intermediate value that is the basis for the updated scramble intermediate value. Thus, the storages scramble_value [0] to scramble_value [18] output the stored scramble intermediate values and stores the updated scramble intermediate values. The storages scramble_value [0] to scramble_value [18] sequentially output the updated scramble intermediate values during R=1 by repeating 16 times. The above processing is repeated until reaching R=215.

The shift register 31 may be a 16-bit shift register shown in FIG. 23 described above, for example. Thus, the shift register 31 is a shift register for operating scramble intermediate values in the normal sequence of the user data direction Q.

As described above, in the column (i=9) in which both of an even number sector and an odd number sector exist, R0 to R107 are in an even number sector and R108 to R215 are in an odd number sector. Thus, the scramble values are S[0000] to S[0107] in R108 to R215. It is thereby necessary to reset the value of the storage scramble_value [9] that sequentially updates the scramble intermediate values corresponding to the column of i=9 and stores the updated values into S[0000] at R108.

Once completing the processing in the path S2, the scramble buffer 17a is reset. During the processing of the path S2, new scramble intermediate values are calculated by the path S1 and stored in one memory area of the scramble buffer 17. After completing the processing on one cluster data, when the scrambler 22 starts the processing on a new data block, it executes scrambling again by using the scramble intermediate values that are stored in this memory area of the scramble buffer 17.

Figure 16:
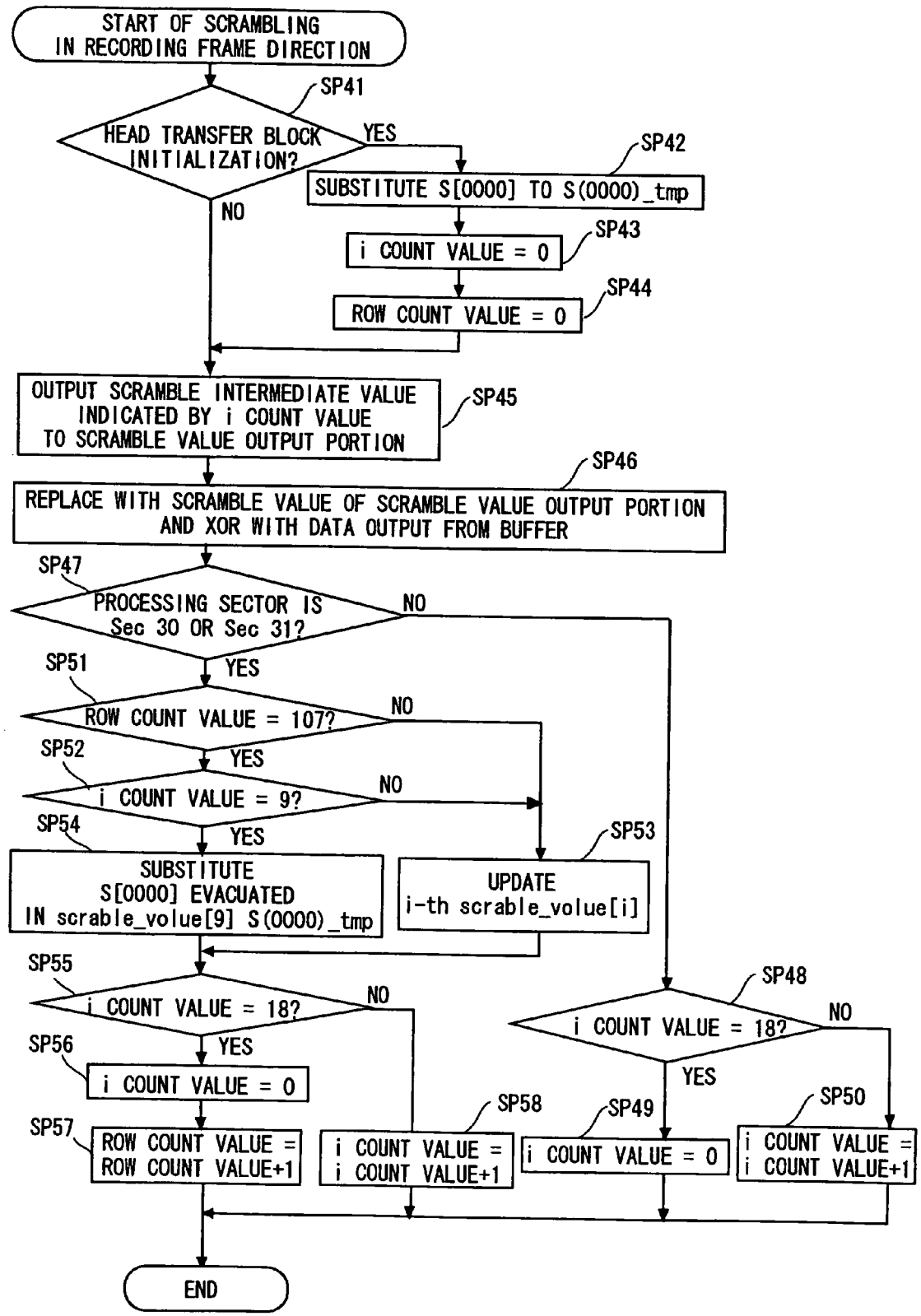
FIG. 16 is a flowchart showing a scrambling process in recording frame direction P according to the first embodiment of the invention.

FIG. 16 is a flowchart showing the processing of the scrambler 22. This embodiment describes the case where the process from Step SP4 is performed repeatedly at each timing of inputting data to the scrambler 22, for example. As shown in Fig.

The scramble value output portion 36 is supplied with a scramble intermediate value S(i) indicated by the i counter 35 from the scramble buffer 17a in Step SP45. The scramble value output portion 36 then outputs a scramble value that extracts the low-order 8 bits from the scramble intermediate value S(i), which is supplied to the XOR circuit 37. The scramble value is then XORed with EDC-added data in the recording frame direction P and supplied to the integration section 101 as scrambled data.

After that, Step SP47 determines whether the processing sector is a final area, which is the sector Sec 30 or Sec 31. If it is the sector Sec 0 to Sec 29, Step SP48 determines whether an i count value is 18. If the i count value is 18, Step SP49 resets the i count value to 0. If, on the other hand, the i count value is smaller than 18, Step SP50 increments the i count value.

On the other hand, if the processing sector is Sec 30 or Sec 31 (YES in Step SP47), Step SP51 determines whether the row count value of the row counter 32 is 107. If the row count value is not 107 (NO in SP51) and if the row count value is 107 and the i count value is not 9 (NO in SP52), Step SP53 updates the i-th scramble intermediate value scramble_value [i] by the shift register 31 and replaces the scramble intermediate value scramble_value[i] with an updated scramble intermediate value.

Then, if the i count value is 18, the count value of the i counter 35 is reset to 0 and the count value of the row counter 32 is incremented (Steps SP55, 56 and 57). If the i count value is smaller than 18, the i count value is incremented (Step SP58). This process is repeated until completing the processing on one cluster, which is the processing on the data of one plane of the substitution buffer 21 times 9 planes in this embodiment since the burst transfer size is 24 bytes.

This embodiment includes the substitution buffer 21 having a memory capacity of one transfer size m of burst transfer or the like times 304 bytes times 2 planes (for writing and reading), an ECC buffer (9728 bytes times 2 planes) for temporarily storing ECC parity, an EDC buffer (4 bytes times 32 times 2 planes) for temporarily storing EDC codes, and a scramble buffer (38 bytes times 2 planes).

Then, the processing of the path 1, which is the encoding in the user data direction Q, temporarily stores obtained EDC, scramble intermediate values and ECC. Then, the processing of the path S2 repeatedly burst transfers the user data form the data buffer 11, thereby enabling high-speed data transfer to the substitution buffer 21. Further, the substitution buffer 21 is configured by a memory that does not require refresh and is capable of random access, which allows the successive data obtained by the burst transfer from the data buffer 11 to be rearranged into the sequence of the recording frame direction P at high speed. In this case, even if the substitution buffer 21 has a capacity of less than a memory capacity of the data buffer 11, which is for example a minimum capacity to read data in the recording frame direction P, it is possible to perform scrambling on the data rearranged into the recording frame direction P by using the operation results such as EDC, scramble intermediate values and ECC that are calculated in the path S1 and stored.

Therefore, though it has been unable to achieve high-speed encoding unless using a temporary memory capable of high speed random access such as SRAM as the user data buffer 11, this embodiment enables high-speed encoding at low cost merely by adding a relatively small size circuit while using SDRAM or the like that is unsuited for high speed random access as the user data buffer 11.

Second Embodiment

Figure 17:
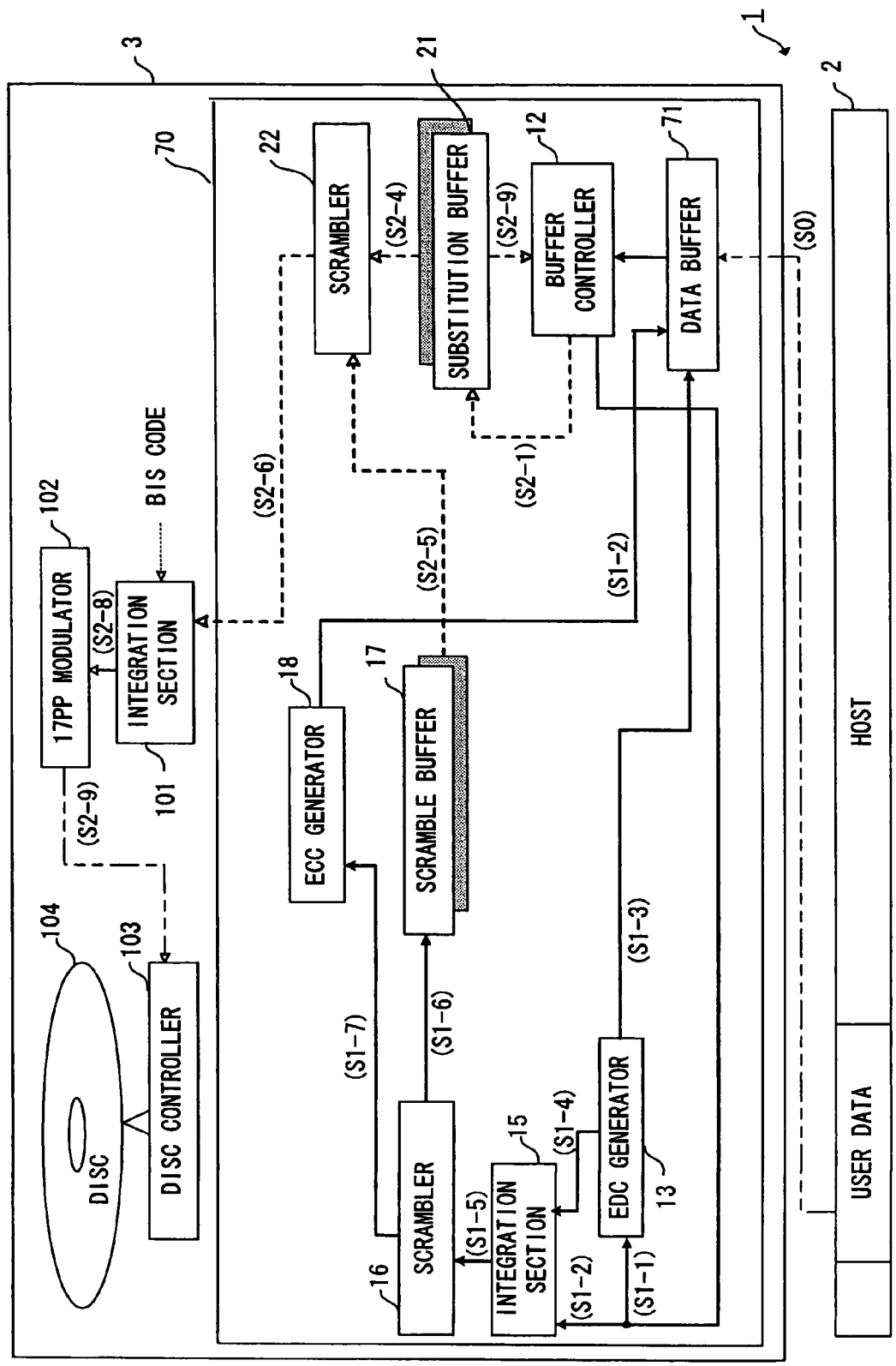
FIG. 17 is a block diagram showing an optical disc recording system according to a second embodiment of the invention.

An encoding device according to the second embodiment is described hereinafter. FIG. 17 is a block diagram showing an optical disc recording system according to this embodiment. In the present embodiment shown in FIG. 17 and an alternative example described later, the same components as in the optical disc system according to the first embodiment shown in FIG. 1 are denoted by the same reference numerals and not described in detail herein.

As shown in FIG. 17, the optical disc system 1 of this embodiment is different from that of the first embodiment in that the encoding device 70 does not include an EDC buffer and an ECC buffer. The EDC and ECC operated in the path S1 may be written back to the data buffer 11 without placing separate buffers. Since an EDC buffer and an ECC buffer do not require high-speed random access, they may be configured by SDRAM or the like. It is therefore feasible to secure a memory amount area in the data buffer 11 that is also configured by the SDRAM or the like.

In this case, the data buffer 11 includes a user data memory area, an EDC memory area and an ECC memory area. As described above, EDC is added to the end of user data in each sector. It is thus feasible to place the EDC data area between sectors when storing user data in the data buffer 11. Specifically, though the first embodiment places a circuit for calculating a head address due to a difference in sector size between the data buffer 11 and the substitution buffer 21, by securing a free space for writing back EDC between sectors and writing EDC to this space, the data buffer 11 stores EDC-added data and thus has the same addresses as in the substitution buffer 21.

Thus, though the first embodiment places the sector boundary detector 40a for converting addresses to set +212 in a sector boundary and +216 in other parts, this embodiment eliminates the need or placing the sector boundary detector 40a since the value can be fixed to +216. Further, writing back EDC to the data buffer 11 eliminates the need for the integration section 20 for adding EDC to user data, thereby achieving a small size and low cost encoding device.

Furthermore, by placing a variable free space of N bytes between sectors of user data, the configuration is compatible with Blu-ray disc when N is set to 4, and it corresponds to the data size (2064 bytes) of one sector of DVD-ROM (ID, IED, CPR_MAI, Main Data, EDC) when N is set to 16, for example. It s thereby possible to share the address control of two or more discs having different formats such as Blu-ray disc and DVD.

Figure 18:
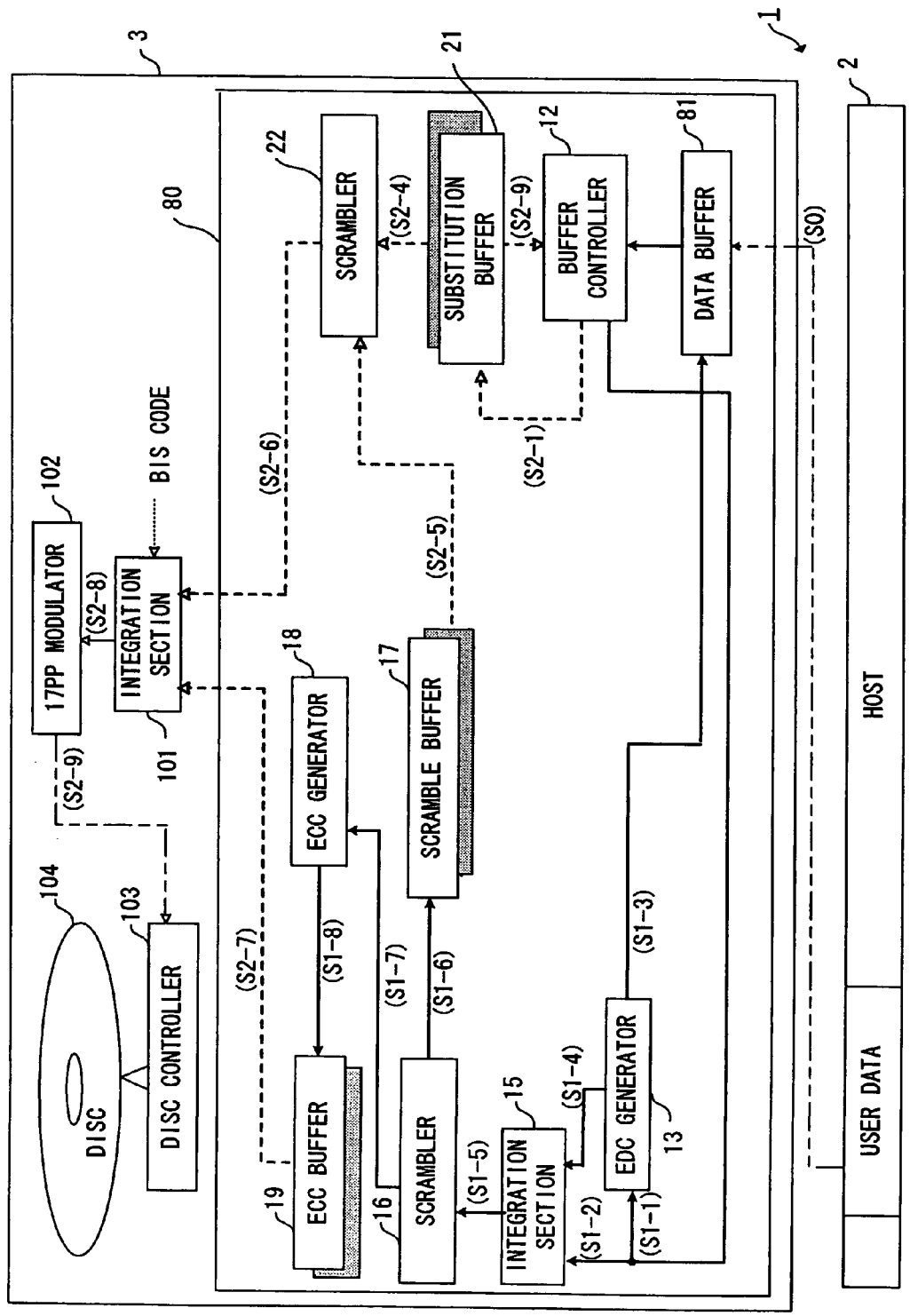
FIG. 18 is a block diagram showing an optical disc recording system according to an alternative example of the second embodiment of the invention.
Figure 19:
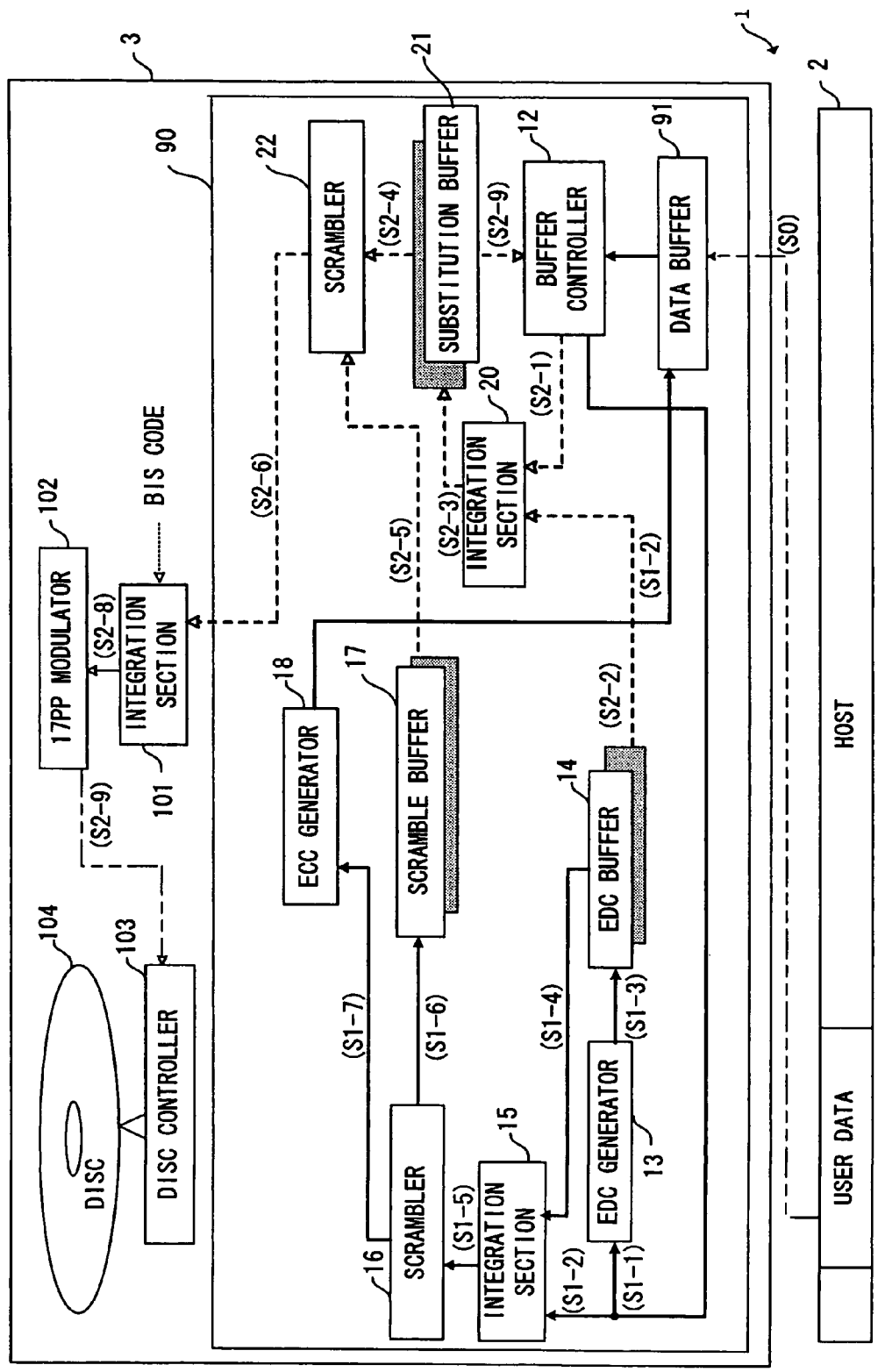
FIG. 19 is a block diagram showing an optical disc recording system according to another alternative example of the second embodiment of the invention.
Figure 20:
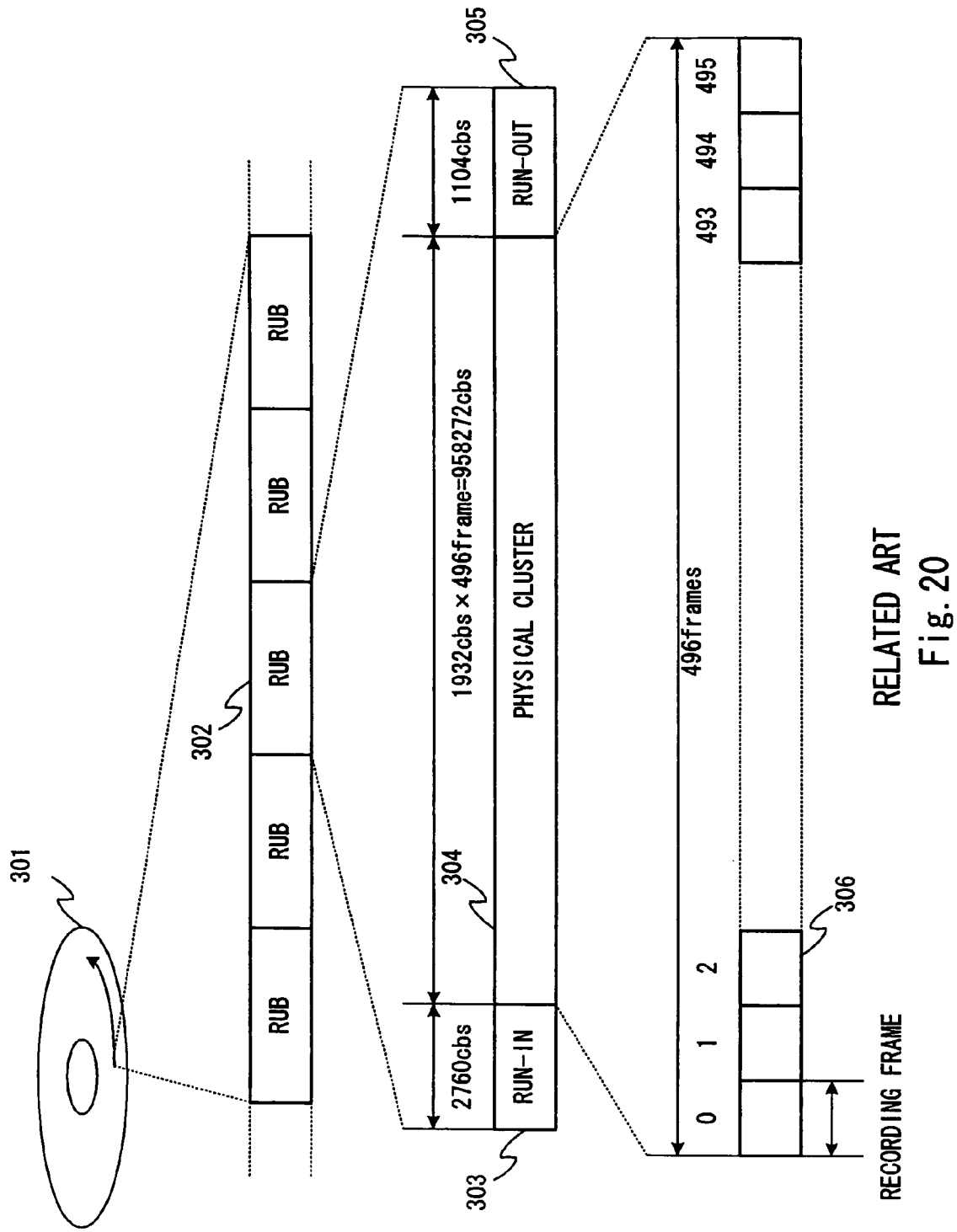
FIG. 20 is a view to describe a data structure of a Blu-ray disc.

FIGS. 18 and 19 are block diagrams showing an alternative example and another alternative example of the second embodiment. As shown in FIG. 18, an encoding device 80 may have the configuration where only EDC is written back to a data buffer 81. Further, as shown in FIG. 19, an encoding device 90 may have the configuration where only ECC is written back to a data buffer 91. The ECC buffer 19 may be placed inside the integration section 101 as described above.

Table below shows the first embodiment, the second embodiment and its alternative example, and comparison results between the reference examples 1 and 2.

TABLE

| Circuit | Present invention | Reference example 1 | Reference example 2 | Comparison result |
|---|---|---|---|---|
| Data buffer (11) | SDRAM etc 65536bytes *2planes | SDRAM etc 65536bytes *2planes | SRAM etc 65536bytes *2planes | Same |
| Substitution buffer (21) | SRAM n*04 bytes *2planes head address calculator | None | None | added |
| Scramble buffer (17) | SRAM 38bytes *2planes | None | None | added |
| *EDC buffer (14) | SDRAM 4bytes*32 *2 planes | None | None | Added or placed in data buffer |
| *ECC buffer (19) | SDRAM 9728bytes *2planes | None | None | Added or placed in data buffer |
| Scrambler (22) | 8bits width *2 planes | 8bits width*1 | 8bit width*1 | 1 added |

In comparison with the reference example 1, the present invention enables high-speed recording though it requires addition of a memory area such as SDRAM for storing EDC and ECC, a small size substitution buffer for high-speed data transfer in recording frame direction P, a scramble buffer for storing a scramble intermediate value for scrambling in recording frame direction P and a scrambler.

In comparison with the reference example 2, the present invention provides an encoding device, a recording apparatus and a recording system capable of high-speed encoding and cost reduction by eliminating the need for configuring the data buffer 11 with a high cost memory capable of high speed random access such as SRAM, though it requires additional circuits.

The present invention is not restricted to the above-described embodiments but may be changed in various ways without departing from the scope of the present invention. For example, though the above embodiment describes a hardware configuration, the present invention is not limited thereto, and a given processing may be implemented by executing computer program on a central processing unit (CPU). In this case, the computer program may be provided by being recorded on a recording medium or by being transmitted through internet or other transmission media.

It is apparent that the present invention is not limited to the above embodiment that may be modified and changed without departing from the scope and spirit of the invention.

What is claimed is:

1. An encoding device for performing a prescribed operation on user data and outputting operated data, the user data being processed in a unit of a user data block, the encoding device comprising:
    an operation value storage unit that stores a first sequence operation result after performing a prescribed operation on user data of a first sequence;
    a substitution buffer that outputs a second sequence data including the user data in a second sequence different from the first sequence, contiguous data in the first sequence being non-contiguous data in the second sequence, a size of the substitution buffer being smaller than that of a user data block; and
    a second sequence operation unit that performs a prescribed operation on the second sequence data by using the first sequence operation result stored in the operation value storage unit and outputting the operated data in the second sequence.

2. The encoding device according to claim 1, further comprising:
    a data buffer that stores the user data input in the first sequence.

3. The encoding device according to claim 2, wherein
    the data buffer comprises a memory requiring refresh and capable of random access and burst transfer, and
    the substitution buffer comprises a memory not requiring refresh and capable of random access and has a memory capacity of equal to or larger than a minimum memory capacity for outputting the second sequence data and smaller than a memory capacity of the data buffer.

4. The encoding device according to claim 2, further comprising:
    a first sequence operation unit that performs a prescribed operation on user data read out from the data buffer in the first sequence,
    wherein the operation value storage unit stores an operation result in the first sequence operation unit as the first sequence operation result.

5. The encoding device according to claim 4, wherein the first sequence operation unit comprises:
    an error detection code operation circuit that outputs data with error detection code after adding an error detection code to the user data of the first sequence read out from the data buffer;
    a scrambler circuit that generates scrambled data from the data with error detection code and a scramble value corresponding to the data with error detection code; and
    an error correction code generation circuit that generates an error correction code from the scrambled data.

6. The encoding device according to claim 5, wherein the operation value storage unit comprises:
    an error detection code storage unit that stores an error detection code operated in the error detection code operation circuit; and
    a scrambling operation value storage unit that stores an operation value used for scrambling on the scrambler circuit.

7. The encoding device according to claim 5, wherein the operation value storage unit comprises an error correction code storage unit for storing the error correction code.

8. The encoding device according to claim 6, wherein the error detection code storage unit is placed in the data buffer.

9. The encoding device according to claim 7, wherein the error correction code storage unit is placed in the data buffer.

10. The encoding device according to claim 2, wherein the data buffer comprises SDRAM and the substitution buffer comprises SRAM or a register.

11. The encoding device according to claim 5, wherein the substitution buffer outputs data with error detection code comprises user data added with the error detection code as the second sequence data.

12. The encoding device according to claim 1, wherein the first sequence comprises a sequence of user data and the second sequence comprises a sequence of recording data on a disc.

13. The encoding device according to claim 2, wherein
the user data is processed in each of a block of M rows by L columns (M and L are integers),
the block contains user data included in a minimum recording unit for recording data on a disc and comprises a plurality of sectors, and
the first sequence and the second sequence are respectively a column direction and a row direction of the block.

14. The encoding device according to claim 1, wherein
the user data is processed in each of a block of M rows by L columns (M and L are integers) and is transferred from the data buffer to the substitution buffer by a burst transfer,
the data buffer includes two or more storage areas of M*L bytes, and
the substitution buffer includes two or more storage areas of m*L bytes if a one-time burst transfer size of the data buffer is m bytes (m is an integer of smaller than M).

15. The encoding device according to claim 11, wherein
the user data is processed in each block of M rows by L columns (M and L are integers) and transferred from the data buffer to the substitution buffer by a burst transfer,
the data buffer includes two or more storage areas of M*L bytes, and
the substitution buffer includes two or more storage areas of m*L bytes if a one-time burst transfer size of the data buffer is m bytes (m is an integer of smaller than M).

16. The encoding device according to claim 13, wherein a sector includes sector size adjustment bytes of N bytes (N is an integer of 0 or greater).

17. The encoding device according to claim 13, wherein a sector includes sector size adjustment bytes of N bytes (N is an integer of 0 or greater), and
a block comprises a sector eliminating the sector size adjustment bytes in the data buffer and a sector including the sector size adjustment byte in the substitution buffer.

18. The encoding device according to claim 13, wherein
the data buffer is capable of a burst transfer of m bytes of user data in the first sequence and comprises a control unit for specifying a head address to read the m bytes of user data from the data buffer and transferring the m bytes of user data to the substitution buffer.

19. The encoding device according to claim 18, wherein
the control unit comprises an address calculator unit for converting an address in the data buffer into an address in the substitution buffer or converting an address in the substitution buffer into an address in the data buffer and transfers the user data in the data buffer to the substitution buffer.

20. The encoding device according to claim 18, wherein
the control unit comprises an address calculator for specifying a head address to read the user data in the data buffer in units of m bytes, and an integration portion for adding the error detection code to the user data read out in units of m bytes to create data with error detection code and supplying the data with error detection code to the substitution buffer, and
the address calculator comprises a sector boundary detector for detecting a boundary of a sector in the data buffer, and an address updater for sequentially calculating the head address according to a result of detecting the sector boundary and outputting a calculation result.

21. The encoding device according to claim 18, wherein the address calculator comprises:
a sector boundary detector for detecting a boundary of the sector in the data buffer;
an address updater for sequentially calculating the head address according to a result of detecting the sector boundary and outputting a calculation result; and
a next transfer block head address storage for calculating a next head address to be burst transferred at a beginning of a next transfer block from a head address to be burst transferred at a beginning of a transfer block stored in the memory area of m*L byte and storing a calculation result,
so that the address calculator sequentially updates an output of the address updater according to the result of detecting the sector boundary and outputs the output as the head address during or after one burst transfer of the transfer block, and reads the next head address from the next transfer block head address storage and outputs the next head address upon completing burst transfer of the transfer block.

22. The encoding device according to claim 20, wherein
the sector comprises merely the user data in the data buffer and comprises data with error detection code that is the user data added with an error detection code in the substitution buffer.

23. The encoding device according to claim 6, wherein
the second sequence operation unit comprises a first sequence shift register for acquiring a scramble value in the first sequence, and a logic circuit for obtaining a scramble value from an output value of the scrambling operation value storage unit and calculating the operated data from the scramble value and the second sequence data, and
the scrambling operation value storage unit stores a value used for operation by the first sequence shift register as the first sequence operation result and repeats sequentially updating and outputting the first sequence operation result by the first sequence shift register.

24. The encoding device according to claim 23, wherein:
the user data is processed in each block comprising a minimum recording unit for recording data on a disc, and the first sequence and the second sequence are respectively a column direction and a row direction of the block,
the block comprises a plurality of sectors, the sectors constituting one area in pairs, each area scrambled by using the same scramble value, and
the scrambling operation value storage unit stores an operation result of the scrambling circuit in one row direction included in the area as the first sequence operation result.

25. An encoding method for performing a prescribed operation on user data and outputting operated data, wherein the method performs in parallel a first processing that performs a prescribed operation on user data of a first sequence and stores an operation result and a second processing that performs a prescribed operation on the user data in a second sequence different from the first sequence from the user data of the first sequence and the operation result and converts the user data into the operated data, and wherein the user data is processed in a unit of a user data block, contiguous data in the first sequence is non-contiguous data in the second sequence, and a size of the substitution buffer is smaller than a size of a user data block.

26. The encoding method for performing a prescribed operation on user data and outputting operated data according to claim 25, wherein:

the first processing performs error detection code generation and scrambling on user data read out from a data buffer storing the user data of the first sequence and stores an error detection code and a scrambling operation value obtained in a process of operation, and the second processing adds the error detection code to the user data read out from the data buffer, transfers the data to a substitution buffer, reads the data from the substitution buffer in the second sequence and scrambles the data according to the scrambling operation value to generate the operated data.

27. The encoding method according to claim 26, wherein the first processing and the second processing are performed in each block composed of user data included in a minimum recording unit on a disc, and the second processing is executed on a (t-1)th block while the first processing is executed on a t-th block.

28. A recording apparatus comprising:

an encoding circuit that performs a prescribed operation on user data to convert the user data into operated data and outputting the operated data;

a modulation circuit that modulates the operated data; and a disc that records modulated data, wherein the user data is processed in a unit of a user data block, and the encoding circuit comprises:

an operation value storage unit that stores a first sequence operation result after performing a prescribed operation on user data of a first sequence;

a substitution buffer that outputs a second sequence data including the user data in a second sequence different from the first sequence, contiguous data in the first sequence being non-contiguous data in the second sequence, and a size of the substitution buffer being smaller than a size of a user data block; and a second sequence operation unit that performs a prescribed operation on the second sequence data by using the first sequence operation result stored in the operation value storage unit and outputting the operated data in the second sequence.

* * * * *